(12) United States Patent
Sasago et al.

(10) Patent No.: US 12,738,520 B2
(45) Date of Patent: Sep. 15, 2026

(54) FUEL BATTERY CELL AND FUEL BATTERY MODULE

(71) Applicant: HITACHI HIGH-TECH CORPORATION, Tokyo (JP)

(72) Inventors: Yoshitaka Sasago, Tokyo (JP); Noriyuki Sakuma, Tokyo (JP); Yumiko Anzai, Tokyo (JP); Munenori Degawa, Tokyo (JP); Chisaki Takubo, Tokyo (JP); Nobuyuki Mise, Tokyo (JP); Seiichi Watanabe, Tokyo (JP); Aritoshi Sugimoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 1019 days.

(21) Appl. No.: 17/417,832

(22) PCT Filed: Jan. 21, 2019

(86) PCT No.: PCT/JP2019/001578
§ 371 (c)(1),
(2) Date: Jun. 24, 2021

(87) PCT Pub. No.: WO2020/152731
PCT Pub. Date: Jul. 30, 2020

(65) Prior Publication Data

US 2022/0069327 A1 Mar. 3, 2022

(51) Int. Cl.
*H01M 8/1213* (2016.01)
*H01M 8/12* (2016.01)

(52) U.S. Cl.
CPC .. *H01M 8/1213* (2013.01); *H01M 2008/1293* (2013.01)

(58) Field of Classification Search
CPC .................................................. H01M 8/1213
See application file for complete search history.

(56) References Cited

U.S. PATENT DOCUMENTS 7,871,734 B2 1/2011 Hertz et al.
2007/0141445 A1* 6/2007 Hertz ................. H01M 4/8885 429/495

(Continued)

FOREIGN PATENT DOCUMENTS

JP 2002-170579 A 6/2002
JP 2005327586 A * 11/2005

(Continued)

OTHER PUBLICATIONS

Avila-Paredes et. al; "Room-temperature protonic conduction in nanocrystalline films of yttria-stabilized zirconia"), as applied to claims 1-2, 4-5 & 10-11 above, and further in view of Park ("Protonic Conduction Properties of Nanostructured Gd-doped CeO2 at Low Temperatures" (Year: 2010).*

(Continued)

*Primary Examiner* — Nathanael T Zemui
(74) *Attorney, Agent, or Firm* — Volpe Koenig

(57) ABSTRACT

Provided is a solid oxide fuel cell having high power generation efficiency and being operable at low temperature. A fuel cell of the present invention includes a cathode electrode, an anode electrode, and a solid electrolyte layer disposed between the cathode electrode and the anode electrode and formed from polycrystalline zirconia or polycrystalline ceria doped with divalent or trivalent positive ions and having proton conductivity, in which the cathode electrode and the solid electrolyte layer are stacked with a first oxygen ion blocking layer interposed therebetween.

20 Claims, 24 Drawing Sheets

(56) References Cited

U.S. PATENT DOCUMENTS

2010/0183952 A1* 7/2010 Amarasinghe ...... H01M 8/0228 429/514
2012/0094213 A1* 4/2012 Ha ........................ H01M 8/126 429/495
2017/0040618 A1 2/2017 Seong et al.
2019/0093242 A1* 3/2019 Petitjean ........... H01M 8/04395
2020/0028192 A1* 1/2020 Onuma ............. H01M 8/04303

FOREIGN PATENT DOCUMENTS

JP 2006-054170 A 2/2006
JP 2007257937 A * 10/2007

OTHER PUBLICATIONS

Park et. al; "Protonic Conduction Properties of Nanostructured Gd-doped CeO2 at Low Temperatures". (Year: 2015).*
JP-2007257937-A Translation from Espacenet (Year: 2007).*
JP-2005327586-A Translation from Espacenet (Year: 2005).*
Evans et al., "Review on Microfabricated Micro-solid Oxide Fuel Cell Membranes," Journal of Power Sources 194, (2009), pp. 119-129.
Taiwanese Office Action issued on May 21, 2020 for the Taiwanese Patent Application No. 108132169.

* cited by examiner 205
1 1 1
204 206
208
208
209
201 203
202 207

FUEL BATTERY CELL AND FUEL BATTERY MODULE

TECHNICAL FIELD

The present invention relates to a fuel cell and a fuel cell module.

BACKGROUND ART

Regarding a solid-oxide proton conduction type fuel cell in which a proton generated from a fuel gas in contact with an anode electrode is conducted in an electrolyte composed of solid oxide and combined with oxygen ions at a cathode to generate water, and thus to generate power, as background arts, the inventions described in PTLs 1 to 4 and NPL 1 are known.

NPL 1 describes a cell technique for forming an anode layer, a solid electrolyte layer, and a cathode layer of a fuel cell membrane by a thin film formation process. By thinning solid electrolyte, an ionic conductivity can be improved, and power generation efficiency can be enhanced. The ionic conductivity of the solid electrolyte shows activation-type temperature dependence. Therefore, the ionic conductivity is large at high temperature and small at low temperature. By thinning the solid electrolyte, a sufficiently large ionic conductivity can be obtained even at low temperature, and practical power generation efficiency can be achieved. As the solid electrolyte layer, for example, YSZ (Yttria Stabilized Zirconia), which is yttria-doped zirconia, or the like is often used. This is because there are advantages that chemical stability is excellent and current due to electrons and holes that cause internal leakage current of the fuel cell is small.

PTL 1 discloses a fuel cell technique using a proton conductor such as $BaCeO_3$ or $SrCeO_3$ as a solid electrolyte. These solid electrolytes are advantageous for improvement of the power generation efficiency because proton conductivity is high. However, it is known that this solid electrolyte reacts upon contact with carbon dioxide gas to generate carbonates such as $BaCO_3$ and $SrCO_3$, which significantly deteriorates performance of the fuel cell. PTL 1 describes a technique for forming, on a surface of a solid electrolyte membrane, a palladium (Pd) membrane that allows permeation of hydrogen as fuel but does not allow permeation of carbon dioxide, assuming that carbon dioxide gas is contained in a reformed gas of fuel.

PTL 2 describes a fuel cell technique in which $BaZrO_3$, $SrZrO_3$, or the like as a proton conductor is used for a solid electrolyte layer on a hydrogen permeable anode substrate. Although the main charge carriers of $BaZrO_3$ and $SrZrO_3$ are protons, oxygen ions ($O_{2-}$) are also conducted. When oxygen ions generated from an oxygen gas in an atmosphere on the cathode side conduct through the solid electrolyte layer and reach a boundary between the hydrogen permeable anode substrate and the solid electrolyte layer, the oxygen ions react with hydrogen to generate water, and there is a problem that adhesiveness between the anode substrate and the solid electrolyte layer is deteriorated. In order to solve this problem, it is described that the conduction of the oxygen ions is suppressed by forming an intermediate layer, formed of an oxide having a small oxygen deficiency amount, between a cathode electrode and a solid electrolyte layer such as $BaZrO_3$ or $SrZrO_3$.

PTL 3 describes a technique for providing a proton block layer, an electron current block layer, and a hole current block layer in a fuel cell using an oxygen ion conductor $Bi_2O_3$ in order to suppress a current due to charge carriers other than oxygen ions, that is, protons, electrons, and holes.

PTL 4 describes a technique related to a single chamber type fuel cell that supplies a gas obtained by mixing oxygen and fuel to both an anode electrode and a cathode electrode. A structure of the fuel cell can be made simpler than a case where a fuel gas and an oxygen gas are supplied to the anode electrode side and the cathode electrode side, respectively.

CITATION LIST

Patent Literatures

PTL 1: JP 2006-54170 A
PTL 2: JP 2007-257937 A
PTL 3: JP 2002-170579 A
PTL 4: U.S. Pat. No. 7,871,734

Non-Patent Literature

NPL 1: Journal of Power Sources 194 (2009) 119-129

SUMMARY OF INVENTION

Technical Problem

Although doped zirconia such as YSZ is known as an oxygen ion conductor, there is a problem that the ion conductivity is not so high. On the other hand, the present inventors have performed thinning to improve the power generation efficiency of doped zirconia, and found for the first time that proton conduction exceeding oxygen ion conduction occurs. When thin film zirconia doped in the solid electrolyte layer of the fuel cell is used, both proton conduction and oxygen ion conduction occur, so that water is generated in the solid electrolyte. If the generated water is not quickly removed into the atmosphere, an electromotive force decreases. Thus, an object of the present invention is to use a fuel cell including, as a solid electrolyte layer, doped zirconia in which proton conductivity appears by thinning, to prevent oxygen ions from conducting in the solid electrolyte layer in the fuel cell, and to suppress generation of water in the solid electrolyte layer.

Similarly to doped zirconia, there is ceria doped with a substance that is an oxygen ion conductor in a bulk state and exhibits proton conduction by thinning. Thus, an object of the present invention is also to prevent oxygen ions generated at a cathode from conducting in a solid electrolyte and suppress generation of water in the solid electrolyte in a fuel cell using a doped thin film ceria for a solid electrolyte layer.

Solution to Problem

The present inventors have found that the above problems are solved by forming an oxygen ion blocking layer having an oxygen ion conductivity lower than that of a solid electrolyte layer between a cathode electrode exposed to an oxygen gas of a solid oxide fuel cell (SOFC) and the solid electrolyte layer formed of doped thin film zirconia or doped thin film ceria, and have completed the present invention That is, a fuel cell of the present invention includes a cathode electrode, an anode electrode, and a solid electrolyte layer disposed between the cathode electrode and the anode electrode and formed from polycrystalline zirconia or polycrystalline ceria doped with divalent or trivalent positive ions and having proton conductivity, in which the cathode electrode and the solid electrolyte layer are stacked with a first oxygen ion blocking layer interposed therebetween.

In a case of a single chamber type fuel cell described in PTL 4, electrodes on both sides are exposed to an oxygen gas, and oxygen ions are generated from oxygen at both the electrodes. In this case, the oxygen ion blocking layer can be formed at a boundary between both the electrodes and a solid electrolyte layer so that oxygen ions do not diffuse into the solid electrolyte layer formed of the doped thin film zirconia or the doped thin film ceria Advantageous Effects of Invention According to the present invention, it is possible to provide a fuel cell having high power generation efficiency and being operable at low temperature, and a fuel cell module using the fuel cell. Problems, configurations, and effects except those described above will be apparent in the description of the following embodiments.

DESCRIPTION OF EMBODIMENTS

Figure 1:
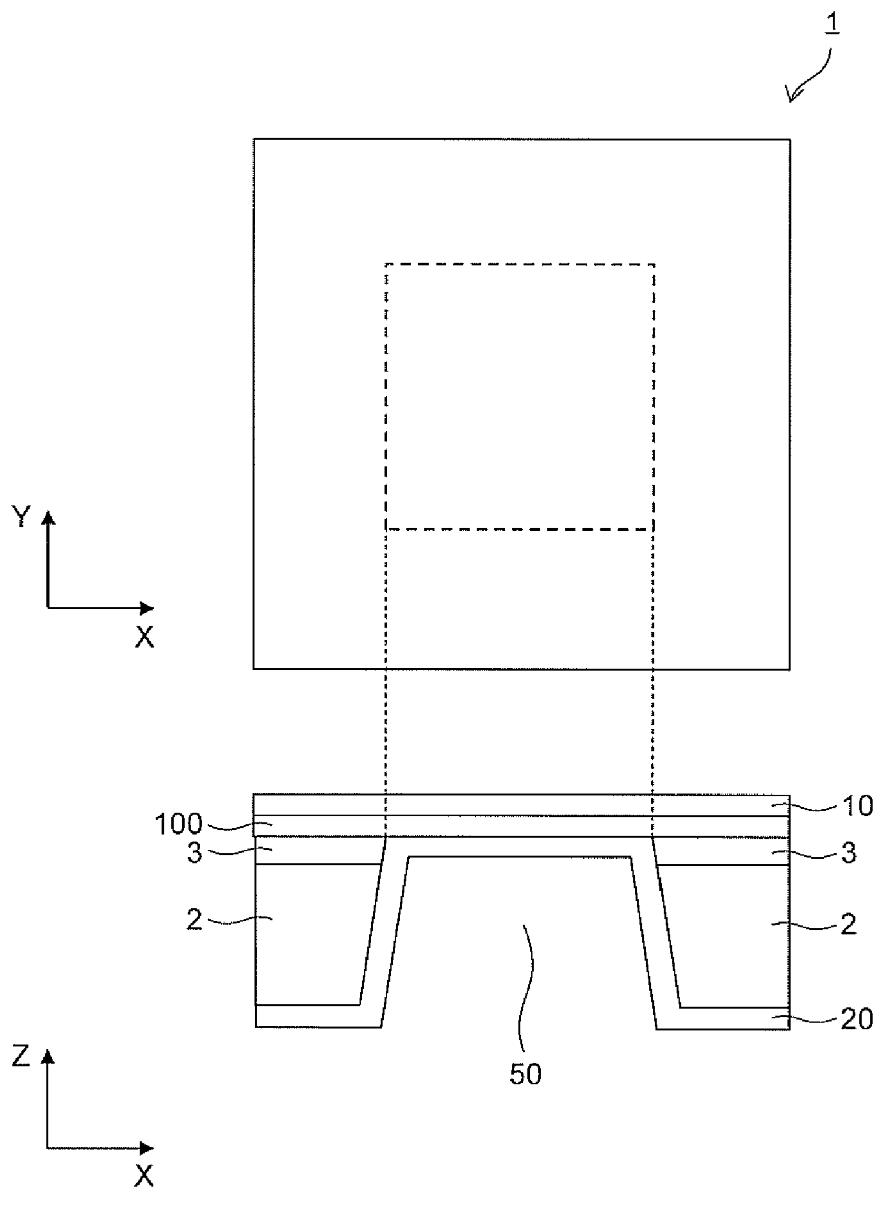
FIG. 1 is a schematic view illustrating an example of a configuration of a conventional thin film process type fuel cell.

Hereinafter, the present invention will be described in detail with reference to embodiments. In all the drawings for explaining the embodiments, the members having the same function are denoted by the same or related reference numerals, and repetitive descriptions thereof are omitted. In addition, in a case of a plurality of similar members (parts), a symbol may be added to a sign of a generic name to indicate a separate or a specific part. In addition, in the following embodiments, unless particularly necessary, the description of the same or similar portion is not repeated in principle.

In the following embodiment, an X direction, a Y direction, and a Z direction are used as directions for description. The X direction and the Y direction are directions orthogonal to each other and constituting a horizontal plane, and the Z direction is a direction perpendicular to the horizontal plane.

In the drawings used in description of the embodiments, hatching may be omitted to make the drawings easy to see even in a cross-sectional view. In addition, hatching may be used to make the drawings easy to see even in a plan view.

In addition, in a cross-sectional view and a plan view, a magnitude of each part does not correspond to an actual device, and the specified portion may be showed relatively larger for easily understanding of the drawings. In addition, even in a case where the cross-sectional view and the plan view correspond to each other, the specified portion may be showed relatively larger for easily understanding of the drawings.

<Improvement of Power Generation Efficiency and Lowering of Operating Temperature by Thin Film Process Type Fuel Cell>

In general, in order to increase power generation efficiency of the fuel cell and realize low-temperature operation, it is necessary to thin an anode electrode, a solid electrolyte layer, and a cathode electrode constituting a fuel cell membrane electrode assembly, and for this purpose, a thin film process type fuel cell in which the anode electrode, the solid electrolyte layer, and the cathode electrode are formed in a film forming process is optimal. FIG. 1 is a schematic view illustrating an example of a configuration of a conventional thin film process type fuel cell. A fuel cell 1 in FIG. 1 includes an anode electrode 20, a solid electrolyte layer 100, and a cathode electrode 10. When all of the anode electrode 20, the solid electrolyte layer 100, and the cathode electrode 10 are thinned, mechanical strength of a fuel cell membrane electrode assembly is weakened; however, as illustrated in FIG. 1, the mechanical strength can be supplemented by supporting the assembly with a substrate 2. An insulation film 3 is provided between the substrate 2 and the solid electrolyte layer 100. An opening 50 is provided at a center of the substrate 2, and the anode electrode 20 and the solid electrolyte layer 100 are in contact with each other at the opening 50. As the substrate, for example, silicon, ceramic, glass, SUS, or the like can be used.

First Embodiment

<Thinned Solid Electrolyte Layer>

It is known that yttria-doped zirconia (YSZ) becomes an oxygen ion conductor at a high temperature in a bulk state, and has very low proton conductivity, electron conductivity, and hole conductivity as compared with oxygen ion conductivity. However, the present inventors have found that high proton conductivity that has not been observed in bulk appears in a thinned polycrystalline film.

Figure 2:
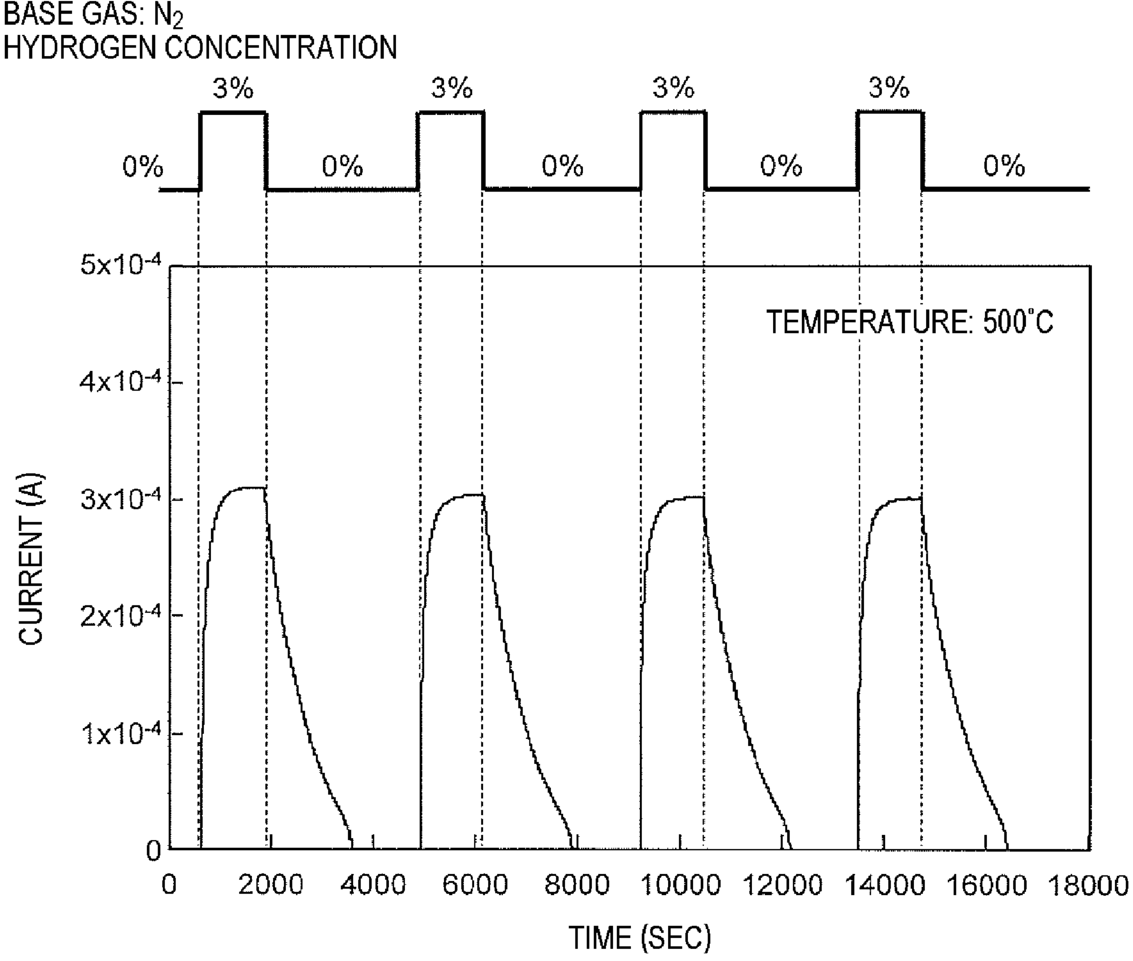
FIG. 2 is a graph illustrating a result of measuring a current due to hydrogen ion conduction of yttria-doped thin film zirconia.

FIG. 2 is data showing atmosphere dependency of a current flowing through YSZ. Specifically, FIG. 2 is a graph illustrating a result of measuring a current due to hydrogen ion conduction of yttria-doped thin film zirconia. Platinum was used for an electrode, and measurement was performed with a zirconia thin film doped with 8% yttria and having a thickness of 500 nm. In the experiment, a platinum electrode was formed on a surface of YSZ, and a hydrogen concentration in an atmosphere was changed while a constant voltage was applied between the electrodes. A base gas is nitrogen. A phenomenon was observed in which the current increased every time the hydrogen concentration was changed from 0% to 3%. This result indicates that a current due to proton conduction flows. The current seen in FIG. 2 is 10 times or more larger than that in a case where an oxygen concentration is changed instead of the hydrogen concentration for the same sample. As described above, since it was found that a solid electrolyte which was an oxygen ion conductor in the bulk exhibits the proton conductivity by thinning, the fuel cell according to the first embodiment was produced using these solid electrolytes for the solid electrolyte layer.

In addition to the yttria-doped thin film zirconia described above, polycrystalline zirconia doped with divalent or trivalent positive ions at the zirconium site or polycrystalline ceria doped with divalent or trivalent positive ions at the cerium site exhibits the proton conductivity by thinning, and is excellent in chemical stability such as not being decomposed even when being exposed to carbon dioxide, as compared with $(BaY)ZrO_3$, $(SrY)ZrO_3$, $(BaY)CeO_3$, $(SrY)CeO_3$, and the like. Furthermore, in polycrystalline zirconia doped with divalent or trivalent positive ions at the zirconium site, an electron current and a hole current, which are internal leakage currents of the fuel cell, so that the solid electrolyte layer can be thinned to improve the power generation efficiency.

Among the above-described $(BaY)ZrO_3$, $(SrY)ZrO_3$, $(BaY)CeO_3$, and $(SrY)CeO_3$ to be compared as a proton conductor, PTL 2 describes a method in which $(BaY)CeO_3$ or $(SrY)CeO_3$ is used for a solid electrolyte layer, and these solid electrolyte layers block oxygen ions slightly conducted with an intermediate layer.

On the other hand, in the present embodiment, doped zirconia, which is known as an oxygen ion conductor in the bulk state and in which electron current and hole current that cause internal leakage of the battery are extremely small as compared with other metal oxides, is used for the solid electrolyte layer. The reason why other ion conductors have been conventionally studied in spite of the excellent properties of doped zirconia is that the oxygen ion conductivity of doped zirconia is insufficient for improving power generation performance; however, as a result of studies by the present inventors, it has been found that the proton conductivity exceeds oxygen ion conductivity in thinned doped zirconia. The properties of doped zirconia are summarized as follows. In each item, the material described on the left is better.

Smallness of electron current and hole current leakage: doped zirconia>other ion conductor chemical stability: doped zirconia>other ion conductor oxygen ion conductivity: LaSrGaMgO>CeGdO>doped zirconia>other oxide Even if proton conductivity of doped zirconia does not reach conductivities of $(BaY)ZrO_3$, $(SrY)ZrO_3$, $(BaY)CeO_3$, and $(SrY)CeO_3$ described above, polycrystalline zirconia doped with divalent or trivalent positive ions can be dramatically thinned by using smallness of electron current and hole current, and therefore, in terms of the proton conductivity in a thin film state, performance exceeding these materials is expected.

Examples of the positive ions doped in the polycrystalline zirconia include one or more positive ions selected from the group consisting of $Y^{3+}$, $Mg^{2+}$, $Ca^{2+}$, and $Sc^{3+}$, As a solid electrolyte having properties similar to those of doped zirconia, there is polycrystalline ceria doped with divalent or trivalent positive ions such as CeGdO. It has been found that, similarly to doped zirconia, doped ceria such as CeGdO is also the oxygen ion conductor in the bulk, but exhibits the proton conductivity by thinning.

Examples of the positive ions doped in the polycrystalline ceria include one or more positive ions selected from the group consisting of $Gd^{3+}$ and $Sm^{3+}$.

<Configurations of Fuel Cell and Fuel Cell Module>

Configurations of the fuel cell and a fuel cell module according to the first embodiment will be described with reference to FIGS. 3 to 8.

Figure 3:
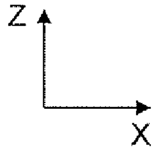
FIG. 3 is a schematic view illustrating an example of a configuration of a fuel cell module using a thin film process type SOFC of a first embodiment.

FIG. 3 is a schematic view illustrating an example of the configuration of the fuel cell module using a thin film process type solid oxide fuel cell (SOFC) according to the first embodiment. As illustrated in FIG. 3, a gas flow path in the fuel cell module is separated into a fuel gas introduction port 201, a fuel gas chamber 202, and a fuel gas exhaust port 203 which are flow paths of a fuel gas, and an air introduction port 204, an air chamber 205, and an air exhaust port 206 which are flow paths of, for example, air containing an oxygen gas. The fuel gas and the air are shielded by a shielding plate 207 so as not to be mixed in the module. A conductive wire 208 is drawn out from an anode electrode and a cathode electrode of the fuel cell 1, and is connected to an external load 209.

Figure 4:
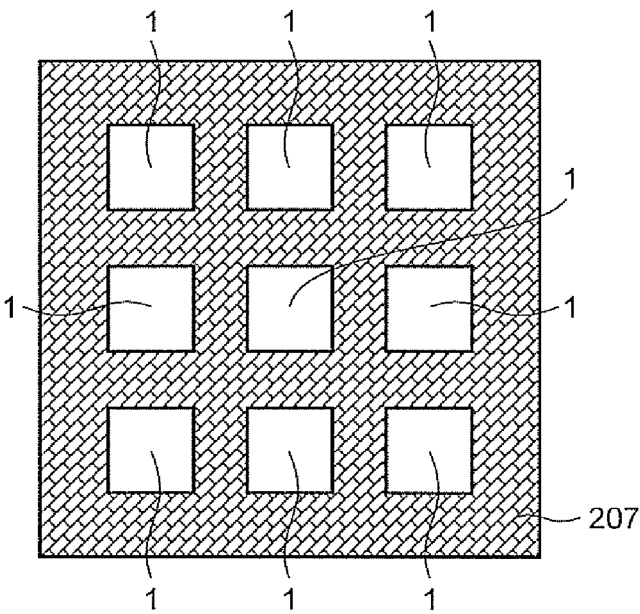
FIG. 4 is a schematic view illustrating an example of a configuration of a fuel cell array of the fuel cell module using the thin film process type SOFC of the first embodiment.
Figure 4:
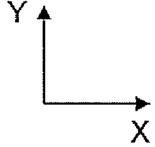
Figure 5:
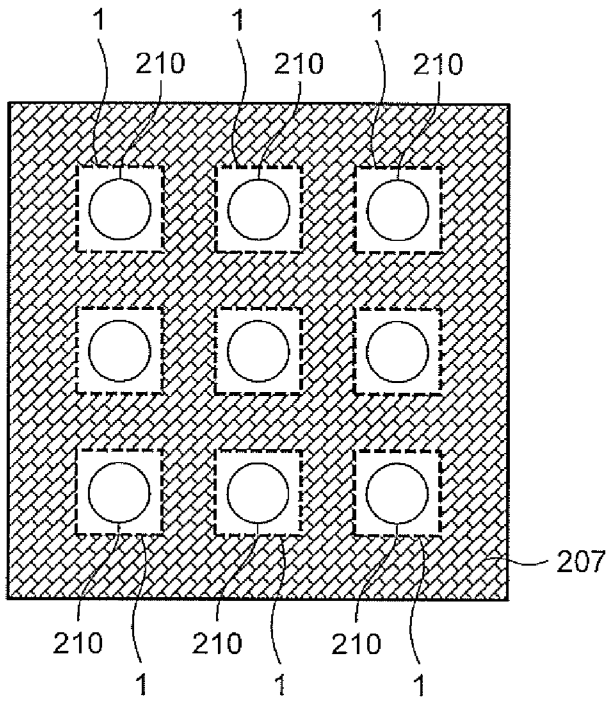
FIG. 5 is a schematic view illustrating an example of the configuration of the fuel cell array of the fuel cell module using the thin film process type SOFC of the first embodiment.
Figure 5:
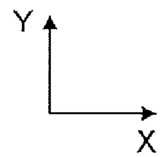

As illustrated in FIG. 4, the fuel cell 1 is mounted on the shielding plate 207. One fuel cell 1 may be provided, but a plurality of the fuel cells 1 are generally arranged. FIG. 4 is a view of the shielding plate 207 as viewed from the fuel cell 1 side (air chamber side). FIG. 5 is a view as viewed from a back side (fuel gas chamber side) of the shielding plate 207. A hole 210 is formed in the shielding plate 207 for each of the fuel cells 1, so that the fuel gas is supplied from the fuel gas chamber to the fuel cell 1. As a result, the anode electrode and the cathode electrode are formed so as to be able to come into contact with the fuel gas and the air, respectively.

Figure 6:
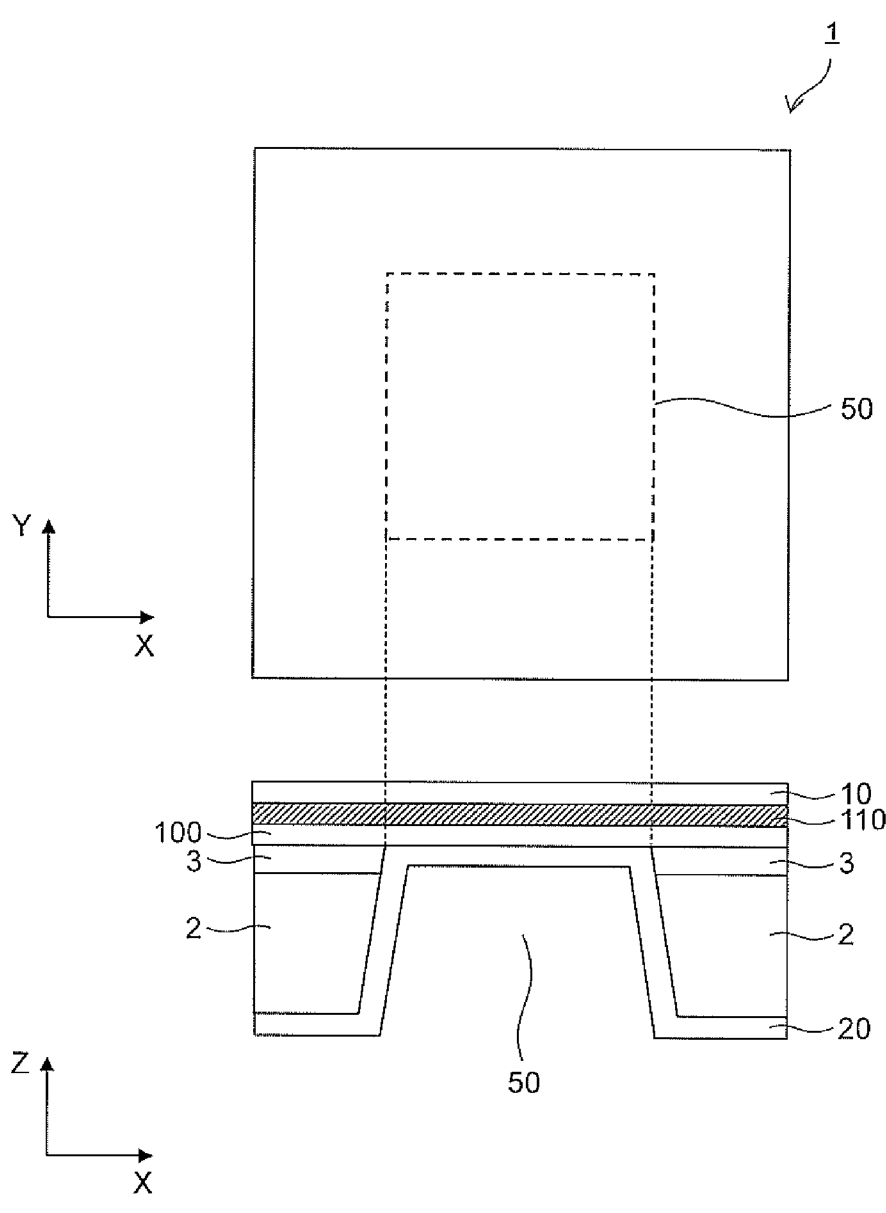
FIG. 6 is a schematic view illustrating an example of a configuration of the thin film process type SOFC of the first embodiment.

FIG. 6 is a schematic view illustrating an example of the configuration of the thin film process type solid oxide fuel cell (SOFC) according to the first embodiment, and corresponds to the fuel cell 1 illustrated in FIGS. 3 to 5. In the present embodiment, the insulation film 3 is formed on an upper surface of the substrate 2 made of silicon or the like. The insulation film 3 can be formed of, for example, a silicon oxide film or a silicon nitride film. An opening 50 is formed at the center of the substrate 2. A thin film such as yttria-doped polycrystalline zirconia (YSZ) to be the solid electrolyte layer 100 is formed on an upper layer of the substrate 2 with the insulation film 3 interposed therebetween. A thickness of the solid electrolyte layer 100 can be, for example, 1000 nm or less. In order to obtain sufficient proton conductivity, the thickness is preferably in a range of 10 nm or more and 500 nm or less. In YSZ, the electron current and the hole current which are the internal leakage currents of the fuel cell are extremely small even at a high temperature, so that YSZ can be thinned to 100 nm or less. The solid electrolyte layer 100 is formed so as to completely cover the opening 50. A second metal layer to be the anode electrode 20 is formed on a lower layer of the substrate 2, that is, on an opposite side of the substrate 2 from the side on which the solid electrolyte layer 100 is formed as viewed in the Z direction. The second metal layer can be formed of, for example, platinum, and is in contact with the solid electrolyte layer 100 via the opening 50. A polycrystalline titanium oxide film to be a first oxygen ion blocking layer 110 is formed on an upper layer of the solid electrolyte layer 100. A first metal layer to be the cathode electrode 10 is formed on an upper layer of the first oxygen ion blocking layer 110. The first metal layer can be formed of, for example, platinum.

Polycrystalline titanium oxide forming the first oxygen ion blocking layer 110 has low oxygen ion conductivity but high proton conductivity. That is, the polycrystalline titanium oxide has a function of selectively transmitting only protons out of oxygen ions and protons. In addition to the polycrystalline titanium oxide, a 3d transition metal oxide such as nickel oxide or a polycrystalline film such as alumina has a similar function, and can be used as the first oxygen ion blocking layer 110.

As described above, in the thin film process type fuel cell 1 including the fuel cell membrane electrode assembly constituted of the second metal layer (platinum) to be the anode electrode 20, the solid electrolyte layer 100 (polycrystalline YSZ), the first oxygen ion blocking layer 110 (polycrystalline titanium oxide), and the first metal layer (platinum) to be the cathode electrode 10 from the lower layer, a fuel gas containing, for example, hydrogen is supplied to the anode electrode 20 side, and gas containing oxygen such as, for example, air is supplied to the cathode electrode 10 side. The anode electrode 20 side and the cathode electrode 10 side are sealed so that the two types of supplied gases do not mix with each other.

Modification of First Embodiment

In the above description, the substrate 2 is a silicon substrate, the solid electrolyte layer 100 is YSZ, the cathode electrode 10 is platinum, and the anode electrode 20 is platinum. However, the following modifications are of course possible.

The substrate 2 can be formed of a member containing ceramic, glass, or steel instead of the silicon substrate.

As the solid electrolyte layer 100, polycrystalline zirconia doped with divalent or trivalent positive ions other than Y can be used instead of YSZ. Besides $Y^{3+}$, for example, $Mg^{2+}$, $Ca^{2+}$, or $Sc^{3+}$ can be used as the positive ion to be doped.

In the solid electrolyte layer 100, ceria doped with divalent or trivalent positive ions can be used instead of YSZ. The positive ions to be doped can be, for example, $Gd^{3+}$ or $Sm^{3+}$, Instead of platinum, the cathode electrode 10 can contain, for example, one or more selected from the group consisting of gold, palladium, iridium, rhodium, ruthenium, osmium, $(La_{1-x}Sr_x)(Co_{1-y}Fey)O_3$ (for example, $La_{0.6}Sr_{0.4}Co_{0.5}Fe_{0.2}O_{3-\delta}$ (wherein $0 \le \delta \le 0.7$)), $Sm_{0.5}Sr_{0.5}CoO_3$, $Ba_{0.8}La_{0.2}CoO_3$, $Gd_{0.5}Sr_{0.5}CoO_3$, $(La_{1-x}Sr_x)MnO_3$, and $(La_{1-x}Sr_x)FeO_3$. In the above formula, $0 \le x \le 1$ and $0 \le y \le 1$ are satisfied. Furthermore, the cathode electrode 10 may be formed of a composite material of the same material as the oxygen ion blocking layer 110 and, for example, gold, palladium, iridium, rhodium, ruthenium, osmium, or the like instead of platinum.

Instead of platinum, the anode electrode 20 can contain, for example, one or more selected from the group consisting of $(Ce_{1-x}Sm_x)O_2$ doped with copper or nickel, $(Ce_{1-x}Gd_x)O_2$ doped with copper or nickel, YSZ doped with nickel, platinum, gold, palladium, iridium, rhodium, ruthenium, and osmium (in the above formula, $0 \le x \le 1$, $0 \le y \le 1$)

Operation and Effects of First Embodiment

Figure 7A:
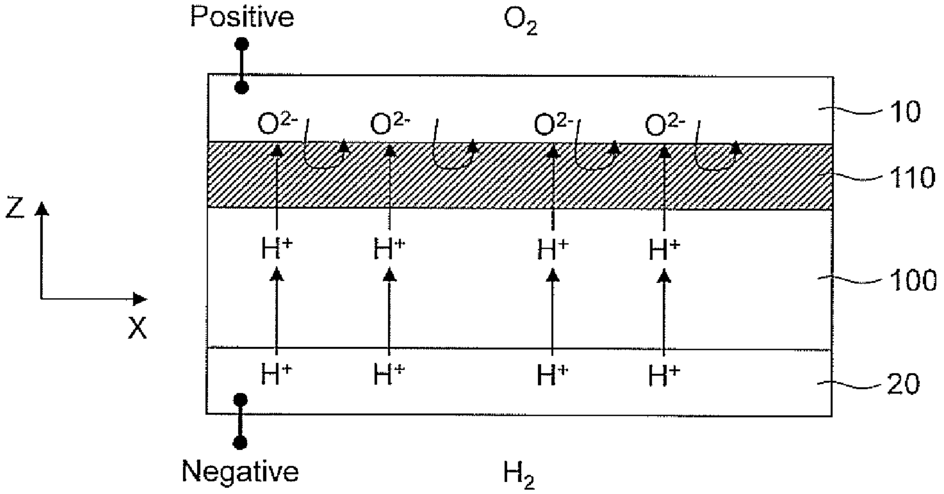
FIG. 7A is a schematic view illustrating movements of oxygen ions and protons in the thin film process type SOFC of the first embodiment.

The operation and effects of the first embodiment will be described with reference to FIGS. 7A-7B. FIG. 7A illustrates movements of oxygen ions and protons in the SOFC of the first embodiment. Oxygen ions are generated from the oxygen gas in the atmosphere on the cathode electrode 10 side, and electrons are taken from the cathode electrode 10 at that time. As a result, the cathode electrode 10 is positively charged. Since the oxygen ion blocking layer 110 is formed between the cathode electrode 10 and the solid electrolyte layer 100, the generated oxygen ions hardly diffuse into the solid electrolyte layer 100. Protons are generated from a hydrogen gas in the atmosphere on the anode electrode 20 side, and electrons are emitted to the anode electrode 20 at that time. As a result, the anode electrode 20 is negatively charged. The generated protons diffuse into the solid electrolyte layer 100, diffuse in the oxygen ion blocking layer 110, and reach the cathode electrode 10. Here, the protons react with oxygen to generate water. When the anode electrode 20 and the cathode electrode 10 are electrically connected to each other outside the fuel cell, a current flows, and in parallel with this, water is continuously generated in the cathode electrode 10; however, since the generated water is released into the atmosphere on the cathode electrode 10 side, water is not generated and retained in the solid electrolyte layer 100.

Figure 7B:
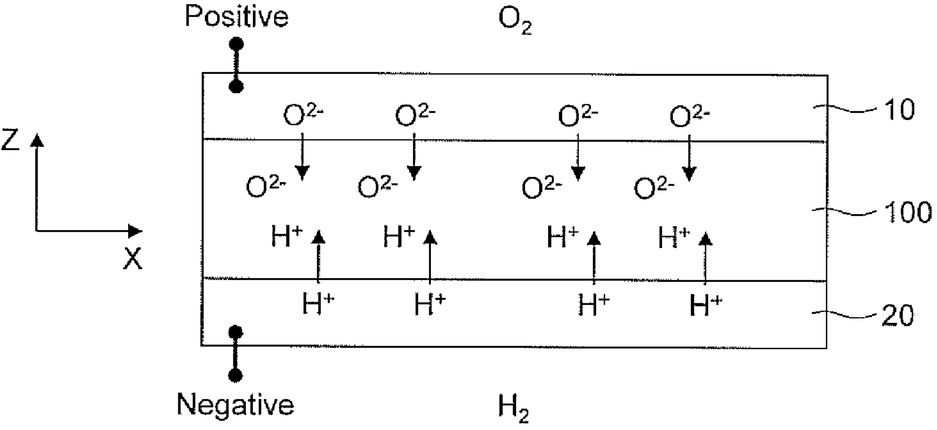
FIG. 7B is a schematic view illustrating movements of oxygen ions and protons in a conventional thin film process type SOFC.

On the other hand, FIG. 7B illustrates movements of oxygen ions and protons in a conventional SOFC. Oxygen ions are generated from the oxygen gas in the atmosphere on the cathode electrode 10 side, and electrons are taken from the cathode electrode 10 at that time. As a result, the cathode electrode 10 is positively charged. The generated oxygen ions diffuse into the solid electrolyte layer 100. Protons are generated from a hydrogen gas in the atmosphere on the anode electrode 20 side, and electrons are emitted to the anode electrode 20 at that time. As a result, the anode electrode 20 is negatively charged. The generated protons also diffuse into the solid electrolyte layer 100. As a result, water is generated and retained from oxygen ions and protons inside the solid electrolyte layer 100. When the anode electrode 20 and the cathode electrode 10 are electrically connected to each other outside the fuel cell, a current flows. Unlike the case of FIG. 7A, water is generated from oxygen ions and protons inside the solid electrolyte layer 100, and an electromotive force decreases as the water is retained.

By using the structure including the oxygen ion blocking layer 110 of the first embodiment, the retention of water inside the solid electrolyte layer 100 is suppressed, and highly efficient power generation utilizing proton conduction characteristics of the solid electrolyte layer 100 can be achieved.

Figure 8:
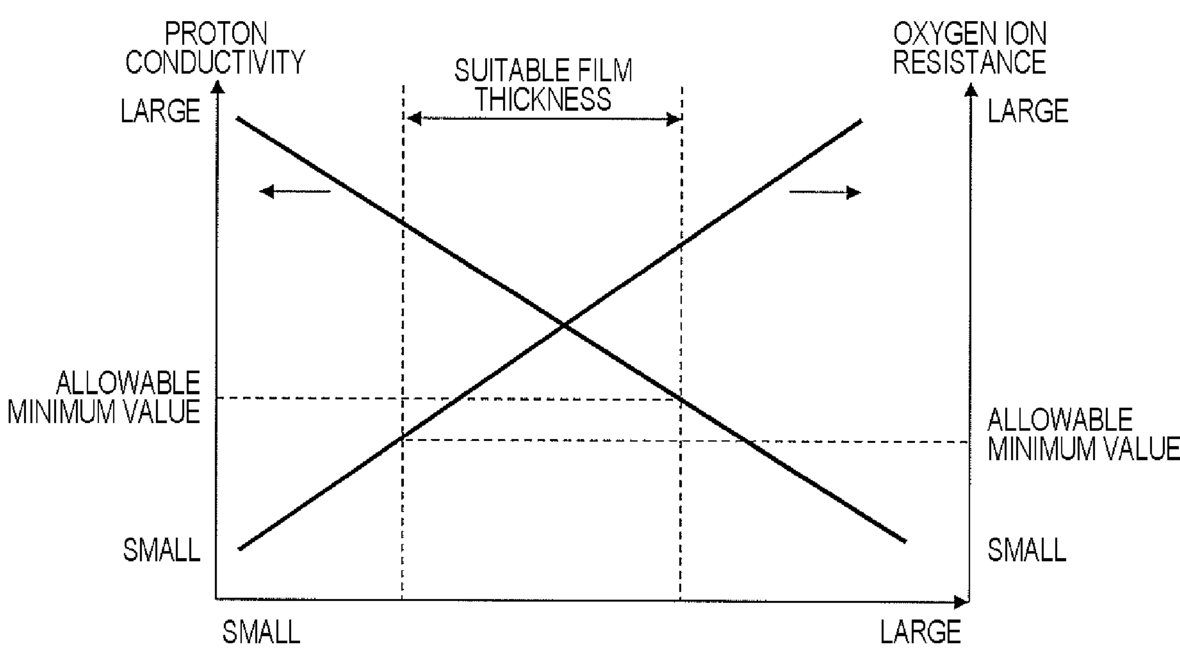
FIG. 8 is a graph illustrating a relationship between a film thickness and proton conductivity of a first oxygen ion blocking layer in the first embodiment.

FIG. 8 is a graph illustrating a relationship between a film thickness and the proton conductivity of the first oxygen ion blocking layer in the first embodiment. As illustrated in FIG. 8, as the thickness of the first oxygen ion blocking layer increases, an oxygen ion blocking effect increases; however, there is a side effect that the proton conductivity is lowered. Thus, the first oxygen ion blocking layer has a suitable film thickness. Depending on the material used for the first ion blocking layer, for example, a suitable film thickness range is several tens of nanometers to several micrometers.

As shown in the table below, when thin film doped zirconia such as YSZ and thin film doped ceria such as $CeGdO_3$, which are material candidates to be used for the solid electrolyte layer 100, are compared with each other, both of the thin film doped zirconia and the thin film doped ceria are large in terms of proton conductivity, and thus are suitable for the solid electrolyte layer of a proton conduction type fuel cell; however, in the first embodiment in which it is necessary to block conduction of oxygen ions, doped zirconia is more excellent. In particular, doped zirconia is more likely to suppress internal leakage of the fuel cell due to electron conduction and hole conduction, which are problematic at high temperatures. The relationship between doped zirconia and doped ceria used as the solid electrolyte layer 100 is the same for the following second to sixth embodiments.

TABLE 1

| | Thin film doped zirconia | Thin film doped ceria |
|---|---|---|
| Proton conductivity | Large | Large |
| oxygen ion conductivity | Small | Large |
| Internal leakage due to electron conduction and hole conduction | Small | Large at 400° C. or higher |

Second Embodiment

A configuration of a fuel cell according to a second embodiment will be described with reference to FIGS. 9 to 14.

In the first embodiment, as illustrated in FIG. 6, an anode electrode 20, a solid electrolyte layer 100, a first oxygen ion blocking layer 110, and a cathode electrode 10 are arranged in this order from the lower layer to form a fuel cell membrane electrode assembly, the anode electrode 20 is formed in a lower layer of a substrate 2, and the solid electrolyte layer 100, the first oxygen ion blocking layer 110, and the cathode electrode 10 are formed in an upper layer of the substrate 2; however, other configurations can be applied.

Figure 9:
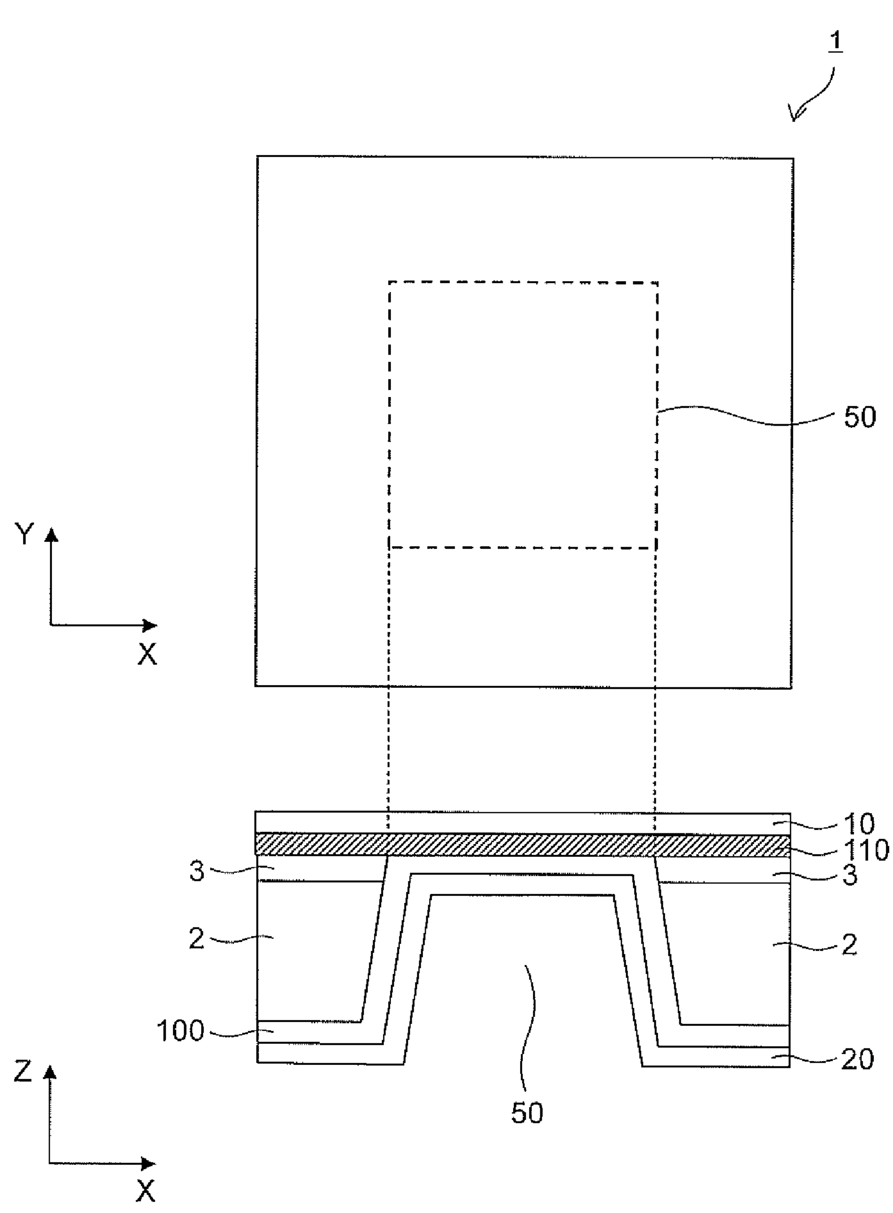
FIG. 9 is a schematic view illustrating an example of a configuration of a thin film process type SOFC of a second embodiment.

An arrangement order of constituent members of the fuel cell membrane electrode assembly in FIG. 9 from the lower layer is the same as that in the first embodiment; however, in FIG. 9, unlike the first embodiment, the anode electrode 20 and the solid electrolyte layer 100 are formed in the lower layer of the substrate 2, and the first oxygen ion blocking layer 110 and the cathode electrode 10 are formed in the upper layer of the substrate 2.

Figure 10:
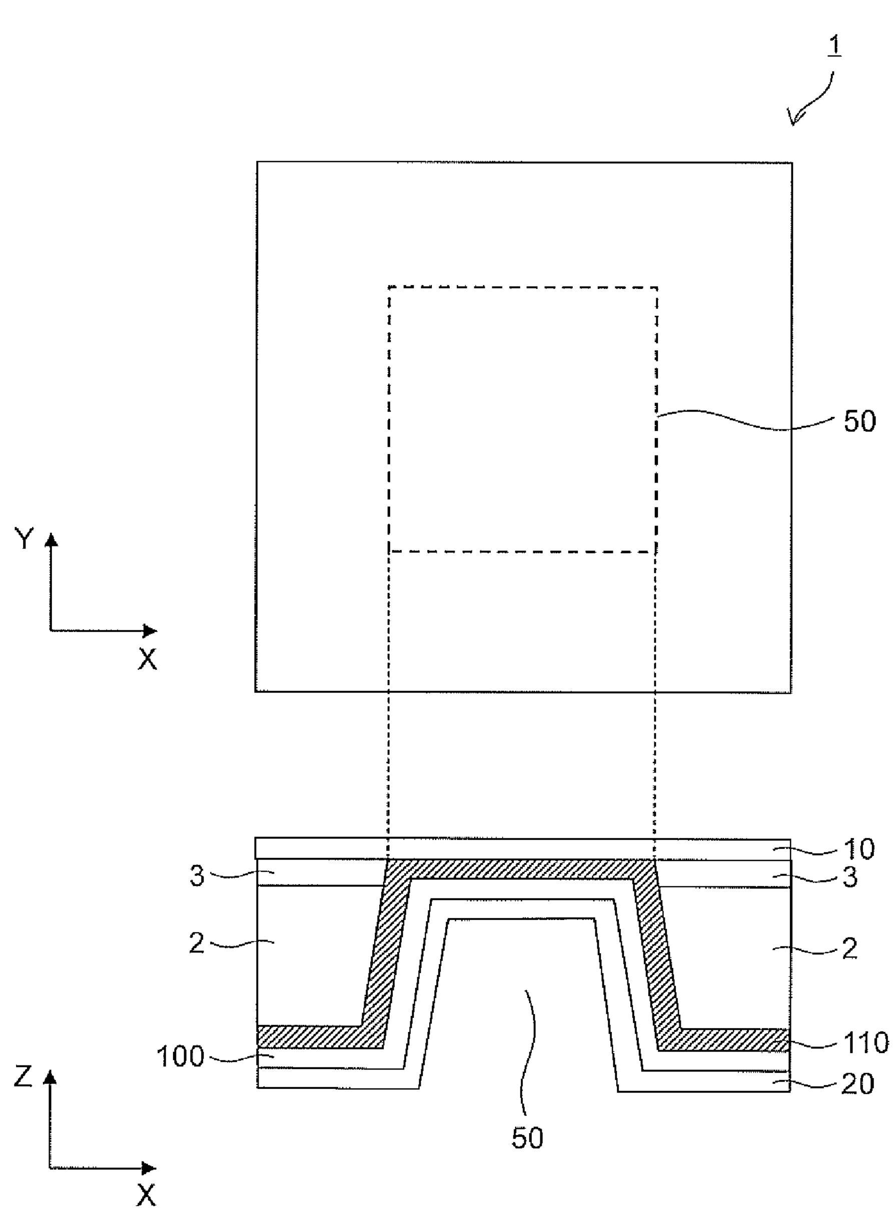
FIG. 10 is a schematic view illustrating an example of the configuration of the thin film process type SOFC of the second embodiment.

An arrangement order of the constituent members of the fuel cell membrane electrode assembly in FIG. 10 from the lower layer is also the same as that in the first embodiment; however, in FIG. 10, unlike the first embodiment and FIG. 9, the anode electrode 20, the solid electrolyte layer 100, and the first oxygen ion blocking layer 110 are formed in the lower layer of the substrate 2, and only the cathode electrode 10 is formed in the upper layer of the substrate 2.

Figure 11:
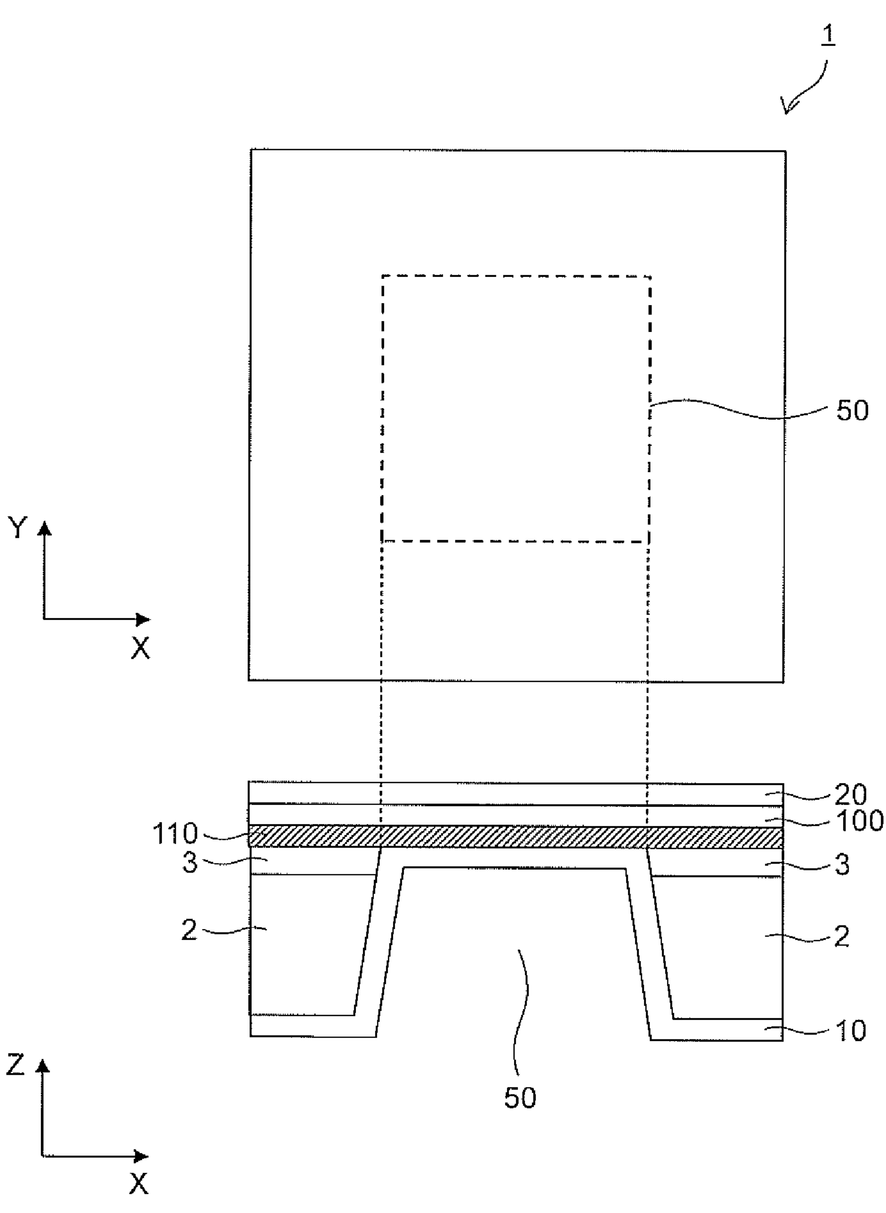
FIG. 11 is a schematic view illustrating an example of the configuration of the thin film process type SOFC of the second embodiment.
Figure 12:
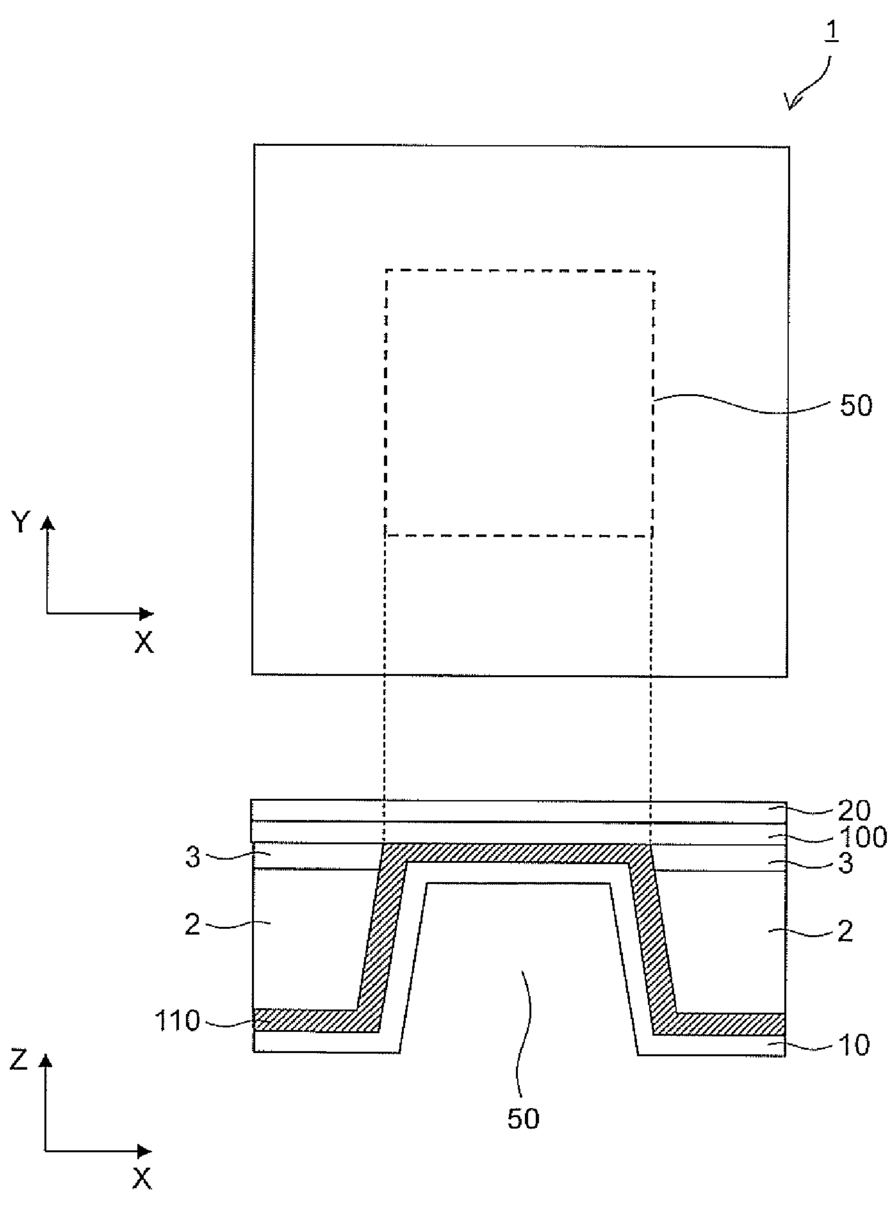
FIG. 12 is a schematic view illustrating an example of the configuration of the thin film process type SOFC of the second embodiment.
Figure 13:
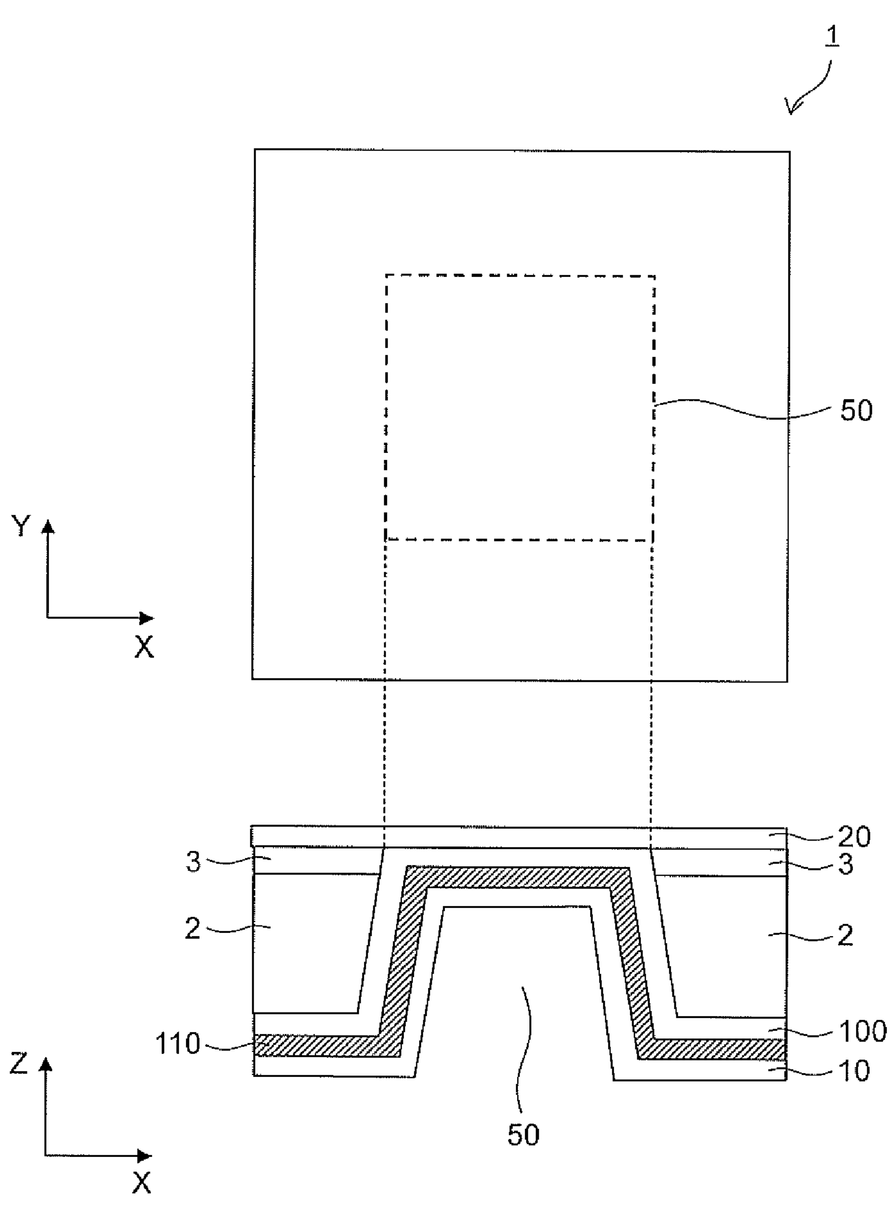
FIG. 13 is a schematic view illustrating an example of the configuration of the thin film process type SOFC of the second embodiment.

In FIGS. 11 to 13, unlike the first embodiment and the embodiment illustrated in FIGS. 9 to 10, as the arrangement order of the constituent members of the fuel cell membrane electrode assembly from the lower layer, the cathode electrode 10, the first oxygen ion blocking layer 110, the solid electrolyte layer 100, and the anode electrode 20 are formed in this order from the lower layer.

In FIG. 11, the cathode electrode 10 is formed in the lower layer of the substrate 2, and the first oxygen ion blocking layer 110, the solid electrolyte layer 100, and the anode electrode 20 are formed in the upper layer of the substrate 2. In FIG. 12, the cathode electrode 10 and the first oxygen ion blocking layer 110 are formed in the lower layer of the substrate 2, and the solid electrolyte layer 100 and the anode electrode 20 are formed in the upper layer of the substrate 2. In FIG. 13, the cathode electrode 10, the first oxygen ion blocking layer 110, and the solid electrolyte layer 100 are formed in the lower layer of the substrate 2, and only the anode electrode 20 is formed in the upper layer of the substrate 2.

Figure 14:
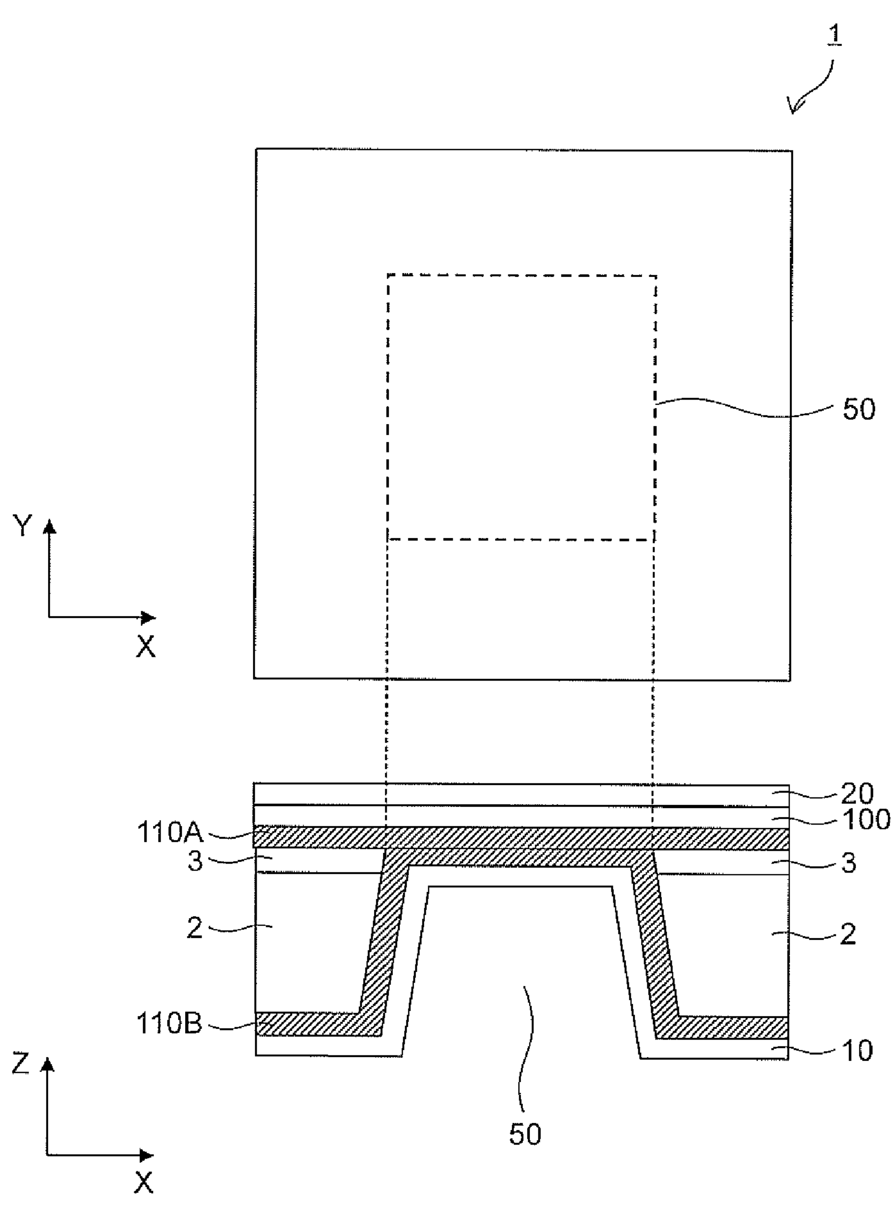
FIG. 14 is a schematic view illustrating an example of the configuration of the thin film process type SOFC of the second embodiment.

In FIG. 14, similarly to FIGS. 11 to 13, as the arrangement order of the constituent members of the fuel cell membrane electrode assembly from the lower layer, the cathode electrode 10, the first oxygen ion blocking layer, the solid electrolyte layer 100, and the anode electrode 20 are formed in this order from the lower layer. However, a portion 110A of the first oxygen ion blocking layer is formed from an upper surface of the substrate 2, and another portion 110B of the first oxygen ion blocking layer is formed from a lower surface of the substrate 2.

As the arrangement order of the constituent members of the fuel cell membrane electrode assembly from the lower layer, as in the first embodiment, even when the anode electrode 20, the solid electrolyte layer 100, the first oxygen ion blocking layer, and the cathode electrode 10 are arranged in this order from the lower layer, it is of course possible to configure the first oxygen ion blocking layer with a formation portion on the upper layer of the substrate 2 and a formation portion on the lower layer of the substrate 2.

A second metal layer to be the anode electrode 20, the solid electrolyte layer 100, and the first metal layer to be the cathode electrode 10, which are constituent members of the fuel cell membrane electrode assembly other than the first oxygen ion blocking layer, can also be configured with the formation portion on the upper layer of the substrate 2 and the formation portion on the lower layer of the substrate 2.

As in the first embodiment, polycrystalline titanium oxide forming the first oxygen ion blocking layer 110 has low oxygen ion conductivity but high proton conductivity. That is, the polycrystalline titanium oxide has a function of selectively transmitting only protons out of oxygen ions and protons. In addition to the polycrystalline titanium oxide, a 3d transition metal oxide such as nickel oxide or a polycrystalline film such as alumina has a similar function, and can be used as the first oxygen ion blocking layer 110.

YSZ can be used for the solid electrolyte layer 100, platinum can be used for the first metal layer to be the cathode electrode 10, and platinum can be used for the second metal layer to be the anode electrode 20; however, the materials described in the modification of the first embodiment can also be used for each layer.

Also in the thin film process type fuel cell of the second embodiment, as in the first embodiment, by using the structure including the oxygen ion blocking layer 110, the retention of water inside the solid electrolyte layer 100 is suppressed, and highly efficient power generation utilizing the proton conduction characteristics of the solid electrolyte layer 100 can be achieved.

Third Embodiment

A configuration of a fuel cell according to a third embodiment will be described with reference to FIGS. 15 to 16. The fuel cell membrane electrode assembly illustrated in FIG. 15 is the same as that of the first embodiment in that the anode electrode 20, the solid electrolyte layer 100, the first oxygen ion blocking layer 110, and the cathode electrode 10 are formed in this order from the lower layer, and the fuel cell membrane electrode assembly completely covers the opening of the substrate 2, but is different in that all the constituent members of the fuel cell membrane electrode assembly are formed in the upper layer of the substrate 2.

Figure 15:
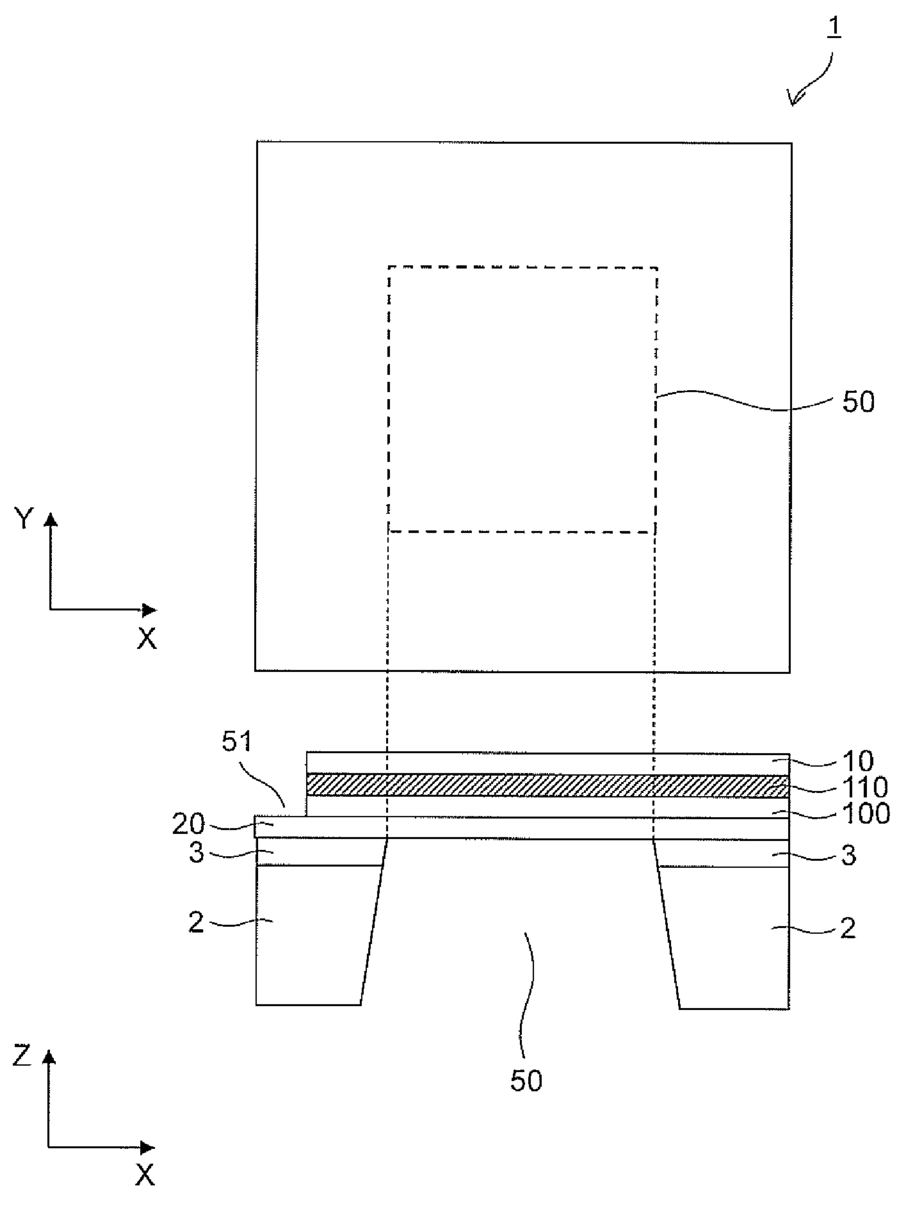
FIG. 15 is a schematic view illustrating an example of a configuration of a thin film process type SOFC of a third embodiment.

When all the constituent members are formed in the upper layer of the substrate 2 as illustrated in FIG. 15, it is necessary to form an electrical contact on the upper layer side between the electrode on the lower layer side (the anode electrode 20 in FIG. 15) and the electrode on the upper layer side (the cathode electrode 10 in FIG. 15), and thus it is necessary to form an exposed region 51 without the solid electrolyte layer 100, the first oxygen ion blocking layer 110, and the cathode electrode 10 on the anode electrode 20 as illustrated in FIG. 15.

Figure 16:
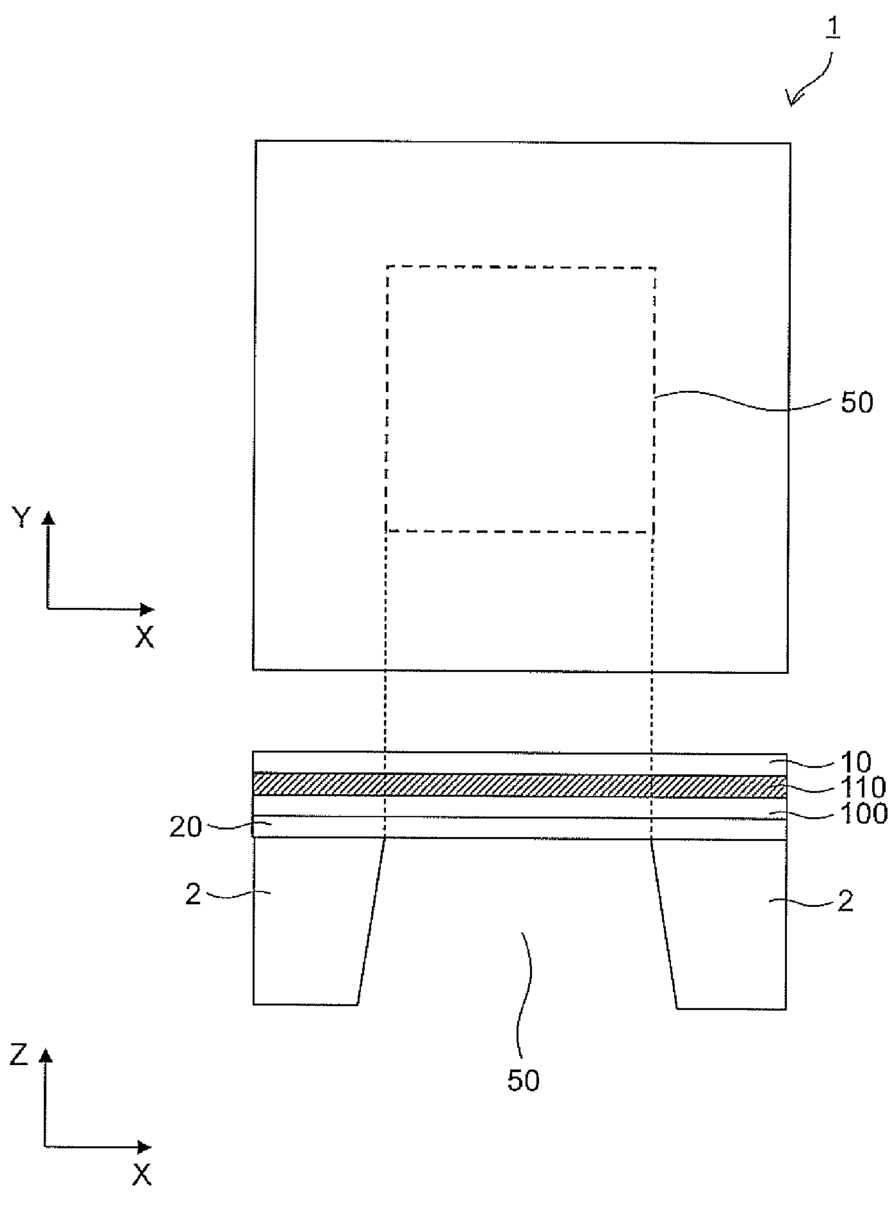
FIG. 16 is a schematic view illustrating an example of the configuration of the thin film process type SOFC of the third embodiment.

In the fuel cell membrane electrode assembly illustrated in FIG. 16, similarly to the embodiment illustrated in FIG. 15, the anode electrode 20, the solid electrolyte layer 100, the first oxygen ion blocking layer 110, and the cathode electrode 10 are formed in this order from the lower layer, and all the constituent members of the fuel cell membrane electrode assembly are formed in the upper layer of the substrate 2. However, FIG. 16 is different in that nickel which is a conductive material is used as the substrate 2, and the substrate 2 and the anode electrode 20 are electrically connected.

In FIG. 16, since the electrical connection with the anode electrode 20 can be achieved via the substrate 2, it is not necessary to form the exposed region 51 without the solid electrolyte layer 100, the first oxygen ion blocking layer 110, and the cathode electrode 10 as illustrated in FIG. 15.

Even when the cathode electrode, the oxygen ion blocking layer, the solid electrolyte layer, and the anode electrode are stacked in this order from the lower layer, the configuration can be similar to that in FIGS. 15 to 16.

As in the first embodiment, polycrystalline titanium oxide forming the first oxygen ion blocking layer 110 has low oxygen ion conductivity but high proton conductivity. That is, the polycrystalline titanium oxide has a function of selectively transmitting only protons out of oxygen ions and protons. In addition to the polycrystalline titanium oxide, a 3d transition metal oxide such as nickel oxide or a polycrystalline film such as alumina has a similar function, and can be used as the first oxygen ion blocking layer 110.

YSZ can be used for the solid electrolyte layer 100, platinum can be used for the first metal layer to be the cathode electrode 10, and platinum can be used for the second metal layer to be the anode electrode 20; however, the materials described in the modification of the first embodiment can also be used for each layer.

Also in the thin film process type fuel cell of the third embodiment, as in the first embodiment, by adopting the structure including the first oxygen ion blocking layer 110, the retention of water inside the solid electrolyte layer 100 is suppressed, and highly efficient power generation utilizing the proton conduction characteristics of the solid electrolyte layer 100 can be achieved.

Fourth Embodiment

Configurations of a fuel cell and a fuel cell module according to a fourth embodiment will be described with reference to FIGS. 17 to 20.

Unlike the first to third embodiments, for example, a mixed gas of a hydrogen-containing fuel gas and an oxygen-containing gas such as air is supplied to the entirety of a thin film process type fuel cell 1 including a fuel cell membrane electrode assembly of the fourth embodiment. Although the same mixed gas is supplied to the anode electrode 20 and the cathode electrode 10, since the materials and shapes of the electrodes are different, a potential difference occurs, and power is generated. Such a fuel cell is referred to as a single chamber type fuel cell. In the single chamber type fuel cell, since it is not necessary to separate and seal a gas system containing a fuel gas and a gas system containing an oxidant such as oxygen, there is an advantage that the structure is simplified and system cost can be reduced.

Figure 17:
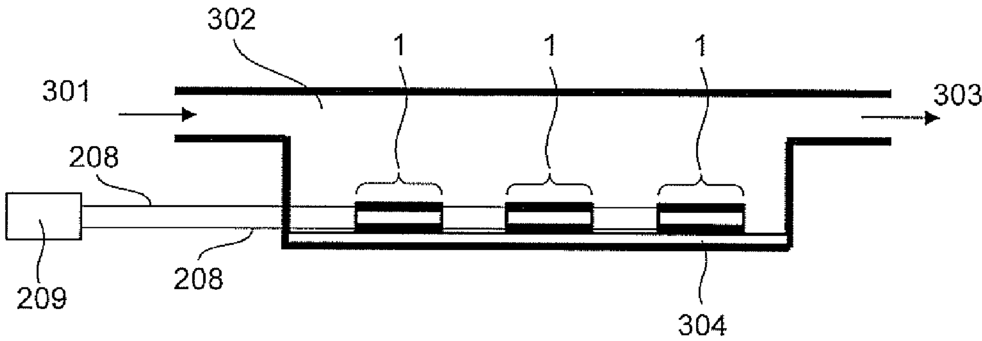
FIG. 17 is a schematic view illustrating an example of a configuration of a fuel cell module using a thin film process type SOFC of a fourth embodiment.
Figure 17:
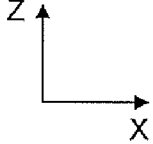

FIG. 17 is a schematic view illustrating an example of a configuration of a fuel cell module using a thin film process type SOFC of the fourth embodiment. A gas to be introduced into the module is a mixed gas containing oxygen and hydrogen, the mixed gas flows along a mixed gas introduction port 301, a mixed gas chamber 302, and a mixed gas exhaust port 303, and the anode electrode and the cathode electrode in the fuel cell 1 are formed to be able to come into contact with the mixed gas. As illustrated in FIG. 3, a conductive wire 208 is drawn out from the anode electrode and the cathode electrode of the fuel cell 1, and is connected to an external load 209. The fuel cell 1 is mounted on a support substrate 304. One fuel cell 1 may be provided, but a plurality of the fuel cells 1 are generally arranged.

Figure 18:
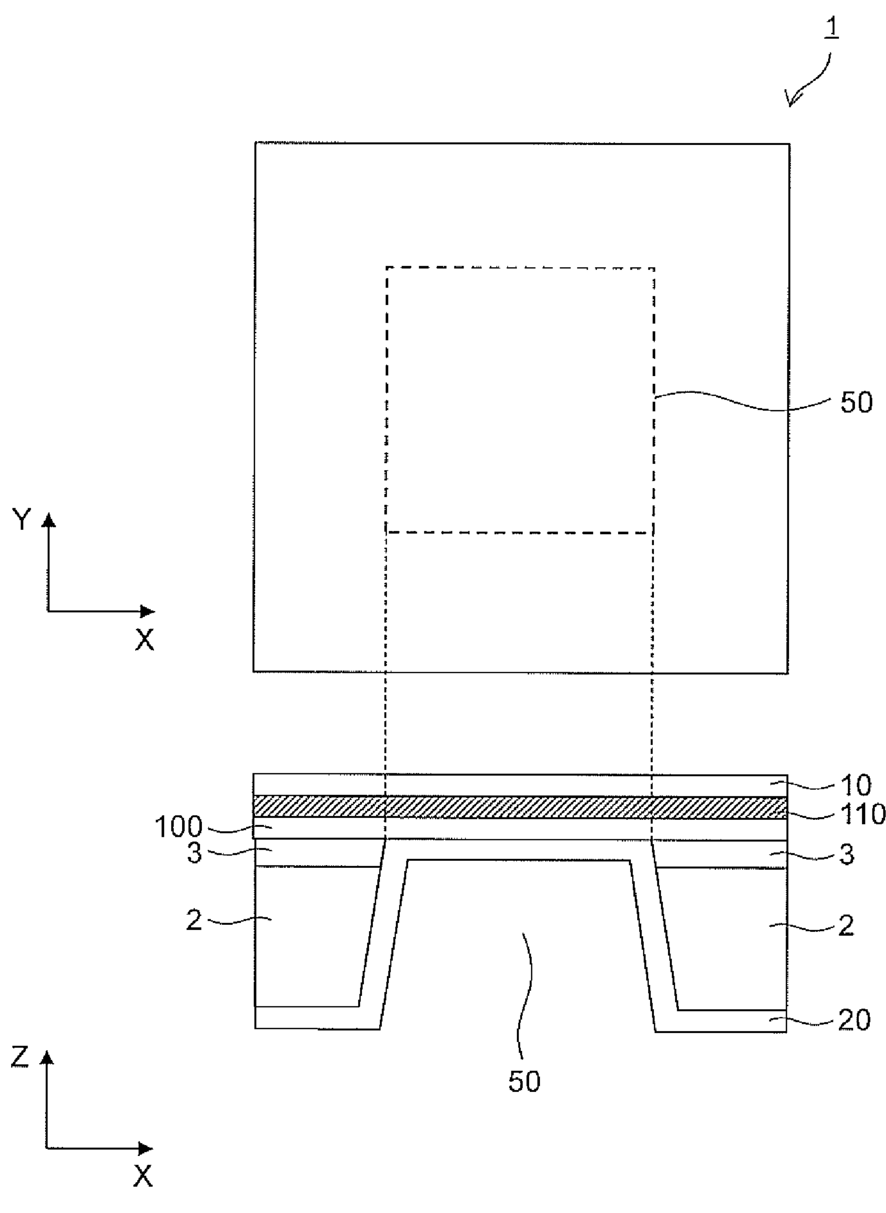
FIG. 18 is a schematic view illustrating an example of the configuration of the thin film process type SOFC of the fourth embodiment.
Figure 19:
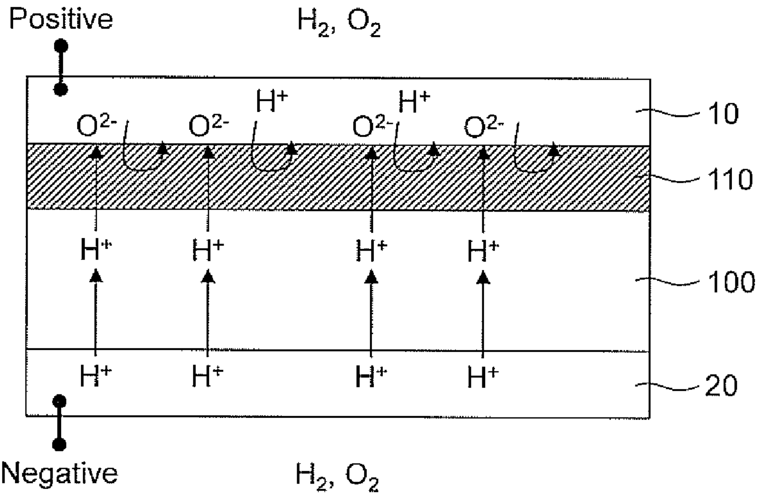
FIG. 19 is a schematic view illustrating movements of oxygen ions and protons in the thin film process type SOFC of the fourth embodiment.
Figure 19:
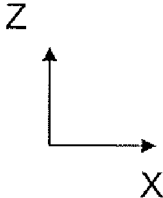

FIG. 18 illustrates a structure suitable for use as a single chamber type fuel cell. In the case of the single chamber type fuel cell, a hydrogen gas and an oxygen gas are supplied to both the anode electrode 20 and the cathode electrode 10. As illustrated in FIG. 19, protons are generated mainly by a catalytic reaction at the anode electrode 20. While a portion of the generated proton reacts with oxygen ions in situ to generate water, the remaining portion diffuses into the solid electrolyte layer 100. Since the proton generation at the anode electrode 20 is faster than the proton generation at the cathode electrode 10, protons as a whole flow from the anode electrode 20 to the cathode electrode 10 via the solid electrolyte layer 100 and the first oxygen ion blocking layer 110. When the first oxygen ion blocking layer 110 is not provided, oxygen ions generated at the cathode electrode 10 partially diffuse into the solid electrolyte layer 100, and combine with protons inside the solid electrolyte layer 100 to generate water. The generated water is retained to decrease the electromotive force. By forming the first oxygen ion blocking layer 110 at a boundary between the cathode electrode 10 and the solid electrolyte layer 100, diffusion of oxygen ions from the cathode electrode 10 is suppressed, and generation of water inside the solid electrolyte layer 100 is suppressed, so that the decrease in electromotive force can be prevented.

As in the first embodiment, polycrystalline titanium oxide forming the first oxygen ion blocking layer 110 has low oxygen ion conductivity but high proton conductivity. That is, the polycrystalline titanium oxide has a function of selectively transmitting only protons out of oxygen ions and protons. In addition to the polycrystalline titanium oxide, a 3d transition metal oxide such as nickel oxide or a polycrystalline film such as alumina has a similar function, and can be used as the first oxygen ion blocking layer 110.

Although YSZ can be used as the solid electrolyte layer 100, the material described in the modification of the first embodiment can also be used. Platinum can be used for the first metal layer to be the cathode electrode 10, and platinum can be used for the second metal layer to be the anode electrode 20; however, the materials described in the modification of the first embodiment can also be used for each layer.

Figure 20:
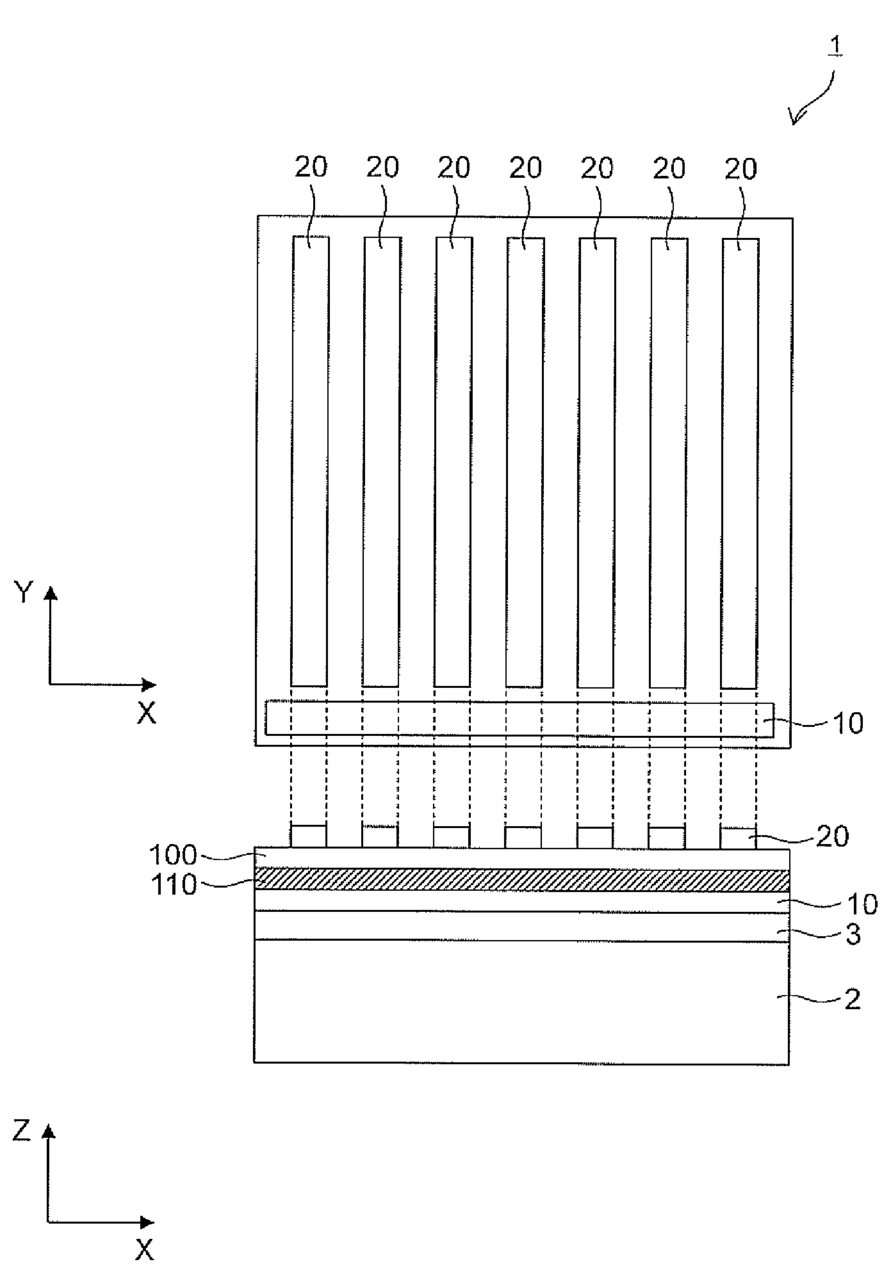
FIG. 20 is a schematic view illustrating an example of the configuration of the thin film process type SOFC of the fourth embodiment.

Although an opening 50 is formed in the substrate 2 in FIG. 18, in the case of the single chamber type fuel cell, since the supply gas is the same on the anode electrode 20 side and the cathode electrode 10 side, it is not necessary to form the opening 50 in the substrate 2. FIG. 20 illustrates an example in which a thin film process type fuel cell including a membrane electrode assembly for a single chamber type fuel cell is formed without forming an opening in the substrate 2. The first oxygen ion blocking layer 110, the solid electrolyte layer 100, and the anode electrode 20 are formed on the cathode electrode 10 formed on a surface of the substrate 2. The cathode electrode 10 is partially exposed for power supply. The anode electrode 20 is formed in a stripe shape extending in a Y direction. When no opening is used, the proton generation by the catalytic reaction at the anode electrode 20 most efficiently occurs at an outer edge of the anode electrode 20, and therefore, a stripe-shaped structure for increasing a peripheral length of the anode electrode 20 is effective for improving the power generation efficiency. When the substrate 2 is formed of an electric conductor as in the third embodiment, the cathode electrode 10 and the substrate 2 are electrically connected, and the power supply to the cathode electrode 10 can be performed via the substrate 2, so that an exposed portion of the cathode electrode 10 as illustrated in FIG. 20 is not necessary.

Fifth Embodiment

A configuration of a fuel cell according to a fifth embodiment will be described with reference to FIGS. 21 to 22. Unlike the first to fourth embodiments, in a fuel cell membrane electrode assembly of the fifth embodiment, in addition to the anode electrode 20, the solid electrolyte layer 100, the first oxygen ion blocking layer 110, and the cathode electrode 10, as illustrated in FIG. 21, a second oxygen ion blocking layer 120 is formed between the anode electrode 20 and the solid electrolyte layer 100.

For example, a mixed gas of a hydrogen-containing fuel gas and an oxygen-containing gas such as air is supplied to the entirety of a thin film process type fuel cell 1 including the fuel cell membrane electrode assembly constituted of a second metal layer (for example, nickel) to be the anode electrode 20, the second oxygen ion blocking layer 120 (for example, polycrystalline nickel oxide), the solid electrolyte layer 100 (for example, polycrystalline YSZ), the first oxygen ion blocking layer 110 (for example, polycrystalline titanium oxide), and the first metal layer (for example, platinum) to be the cathode electrode 10 from the lower layer. Although the same mixed gas is supplied to the anode electrode 20 and the cathode electrode 10, since the electrode materials are different, a potential difference occurs, and power is generated. As in the fourth embodiment, the fuel cell of the fifth embodiment is referred to as a single chamber type fuel cell. In the single chamber type fuel cell, since it is not necessary to separate and seal a gas system containing a fuel gas and a gas system containing an oxidant such as oxygen, there is an advantage that the structure is simplified and system cost can be reduced.

Figure 21:
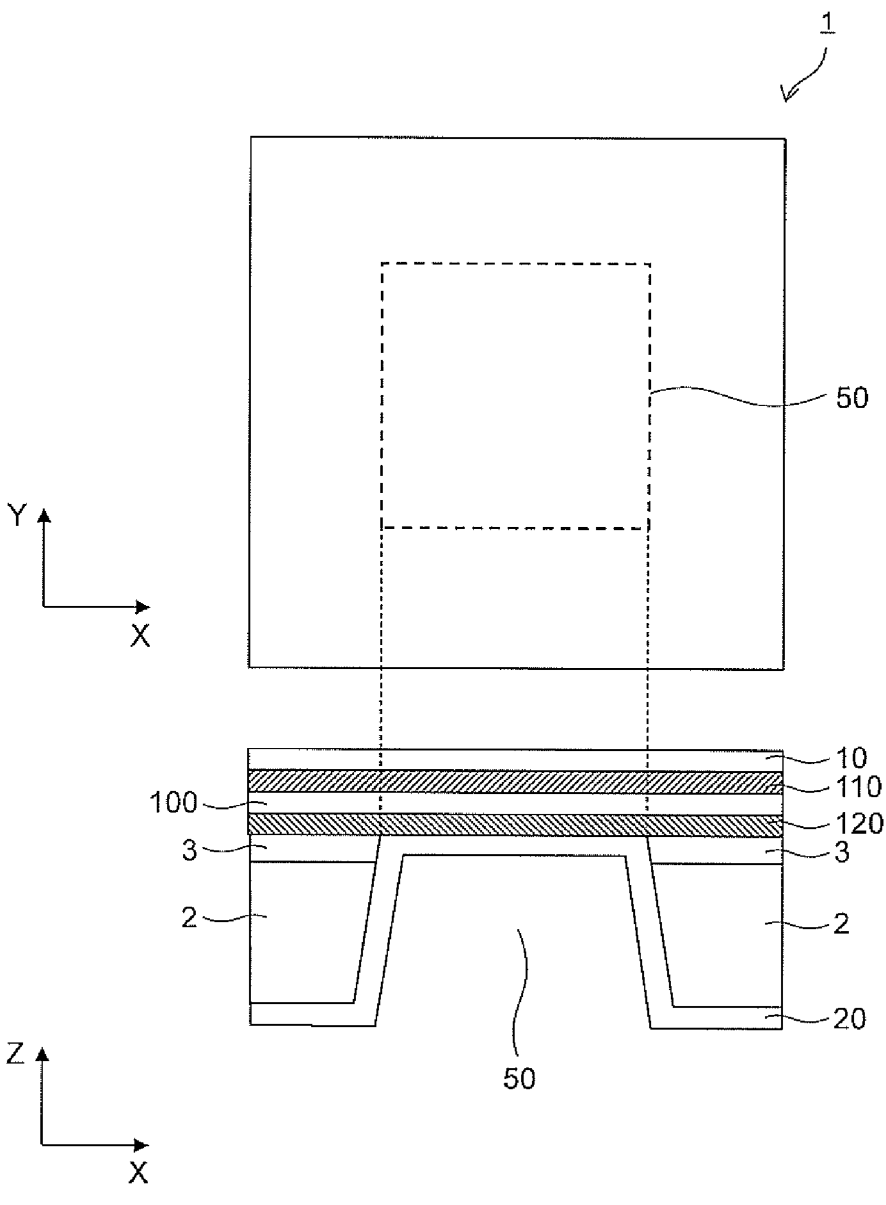
FIG. 21 is a schematic view illustrating an example of a configuration of a thin film process type SOFC of a fifth embodiment.
Figure 22:
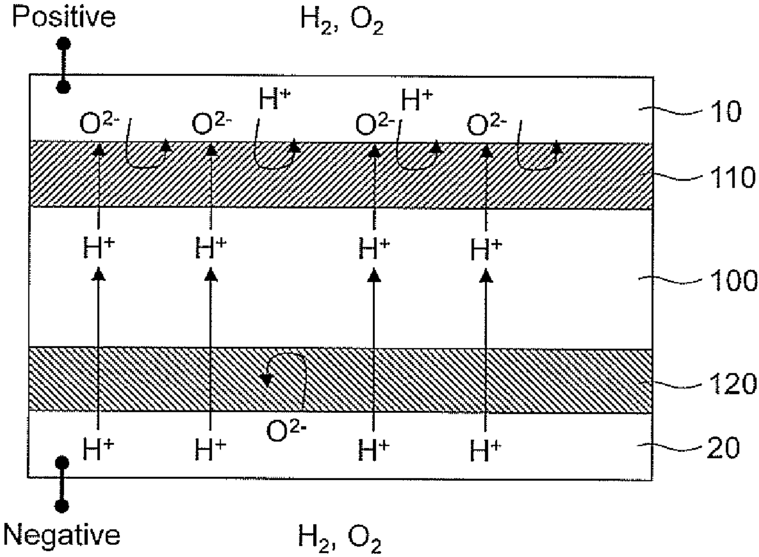
FIG. 22 is a schematic view illustrating movements of oxygen ions and protons in the thin film process type SOFC of the fifth embodiment.
Figure 22:
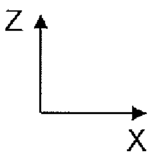

FIG. 21 illustrates a structure suitable for use as the single chamber type fuel cell and different from that of the fourth embodiment. In the case of the single chamber type fuel cell, since a hydrogen gas and an oxygen gas are supplied to both the anode electrode 20 and the cathode electrode 10, protons and oxygen ions are generated by the catalytic reaction at both the electrodes as illustrated in FIG. 22. While a portion of the generated proton reacts with oxygen ions in situ to generate water, the remaining portion diffuses into the solid electrolyte layer 100. Since the proton generation at the anode electrode 20 is faster than the proton generation at the cathode electrode 10, protons as a whole flow from the anode electrode 20 to the cathode electrode 10 via the second oxygen ion blocking layer 120, the solid electrolyte layer 100, and the first oxygen ion blocking layer 110. When the second oxygen ion blocking layer 120 is not provided, oxygen ions generated at the anode electrode 20 partially diffuse into the solid electrolyte layer 100, and combine with protons inside the solid electrolyte layer 100 to generate water. The generated water is retained to decrease the electromotive force. Since the second oxygen ion blocking layer 120 formed at a boundary between the anode electrode 20 and the solid electrolyte layer 100 suppresses diffusion of oxygen ions from the anode electrode 20 and generation of water inside the solid electrolyte layer 100, the decrease in electromotive force can be prevented. A role of the first oxygen ion blocking layer 110 formed at the boundary between the cathode electrode 10 and the solid electrolyte layer 100 is the same as that of the first to fourth embodiments.

As in the first embodiment, polycrystalline titanium oxide forming the first oxygen ion blocking layer 110 has low oxygen ion conductivity but high proton conductivity. That is, the polycrystalline titanium oxide has a function of selectively transmitting only protons out of oxygen ions and protons. In addition to the polycrystalline titanium oxide, a 3d transition metal oxide such as nickel oxide or a polycrystalline film such as alumina has a similar function, and can be used as the first oxygen ion blocking layer 110. The same material as that of the first oxygen ion blocking layer 110 can also be used for the second oxygen ion blocking layer 120.

Although YSZ can be used as the solid electrolyte layer 100, the material described in the modification of the first embodiment can also be used.

Platinum can be used for the first metal layer to be the cathode electrode 10, and nickel can be used for the second metal layer to be the anode electrode 20; however, the materials described in the modification of the first embodiment can also be used for each layer.

As in the second and third embodiments, the arrangement order of the constituent members of the fuel cell membrane electrode assembly can be reversed vertically. Furthermore, as in the second and third embodiments, there are a plurality of options for a constituent member to be formed in the upper layer of the substrate 2 and a constituent member to be formed in the lower layer of the substrate 2.

Specifically, when the fuel cell membrane electrode assembly includes the anode electrode 20, the second oxygen ion blocking layer 120, the solid electrolyte layer 100, the first oxygen ion blocking layer 110, and the cathode electrode 10 in this order from the lower layer, the following combinations are provided as combinations formed in the lower layer and the upper layer of the substrate 2. A first example is a combination of the anode electrode 20 in the lower layer, and the second oxygen ion blocking layer 120, the solid electrolyte layer 100, the first oxygen ion blocking layer 110, and the cathode electrode 10 in the upper layer. A second example is a combination of the anode electrode 20 and the second oxygen ion blocking layer 120 in the lower layer, and the solid electrolyte layer 100, the first oxygen ion blocking layer 110, and the cathode electrode 10 in the upper layer. A third example is a combination of the anode electrode 20, the second oxygen ion blocking layer 120, and the solid electrolyte layer 100 in the lower layer, and the first oxygen ion blocking layer 110 and the cathode electrode 10 in the upper layer. A fourth example is a combination of the anode electrode 20, the second oxygen ion blocking layer 120, the solid electrolyte layer 100, and the first oxygen ion blocking layer 110 in the lower layer and the cathode electrode 10 in the upper layer.

When the fuel cell membrane electrode assembly includes the cathode electrode 10, the first oxygen ion blocking layer 110, the solid electrolyte layer 100, the second oxygen ion blocking layer 120, and the anode electrode 20 in this order from the lower layer, the following combinations are provided as combinations formed in the lower layer and the upper layer of the substrate 2. A first example is a combination of the cathode electrode 10 in the lower layer, and the first oxygen ion blocking layer 110, the solid electrolyte layer 100, the second oxygen ion blocking layer 120, and the anode electrode 20 in the upper layer. A second example is a combination of the cathode electrode 10 and the first oxygen ion blocking layer 110 in the lower layer, and the solid electrolyte layer 100, the second oxygen ion blocking layer 120, and the anode electrode 20 in the upper layer. A third example is a combination of the cathode electrode 10, the first oxygen ion blocking layer 110, and the solid electrolyte layer 100 in the lower layer, and the second oxygen ion blocking layer 120 and the anode electrode 20 in the upper layer. A fourth example is a combination of the cathode electrode 10, the first oxygen ion blocking layer 110, the solid electrolyte layer 100, and the second oxygen ion blocking layer 120 in the lower layer and the anode electrode 20 in the upper layer.

Similarly to the first oxygen ion blocking layer in FIG. 14 of the third embodiment, any one of the constituent members of the fuel cell membrane electrode assembly may be formed of both a layer formed from the upper layer of the substrate 2 and a layer formed from the lower layer of the substrate 2.

Also in the fifth embodiment, similarly to FIG. 20 of the fourth embodiment, the opening of the substrate 2 may not be formed.

In the fuel cell membrane electrode assembly of the fifth embodiment, it is necessary to form the second oxygen ion blocking layer as compared with the fourth embodiment, so that the number of manufacturing steps increases; however, not only oxygen ions generated at the cathode electrode 10 but also oxygen ions generated at the anode electrode 20 can be prevented from entering the solid electrolyte layer, so that an effect of suppressing the decrease in electromotive force due to the retention of water in the solid electrolyte layer 100 is large.

Although the fuel cell membrane electrode assembly of the fourth embodiment is inferior to the fifth embodiment in the effect of suppressing the decrease in electromotive force due to the retention of water in the solid electrolyte layer, the effect can be obtained with a smaller number of manufacturing steps.

Sixth Embodiment

A configuration of a fuel cell according to a sixth embodiment will be described with reference to FIGS. 23 to 24. In the sixth embodiment, the cathode electrode 10 and the anode electrode 20 of the first to fifth embodiments are formed of a composite material.

Figure 23:
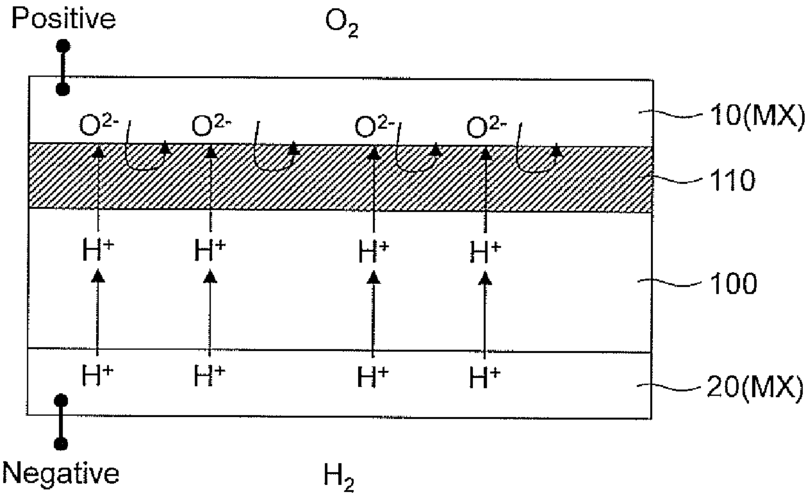
FIG. 23 is a schematic view illustrating an example of a configuration of a thin film process type SOFC of a sixth embodiment.
Figure 23:
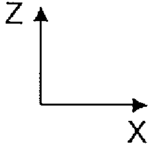

As a modification of the fuel cell membrane electrode assembly of the first to third embodiments, the cathode electrode 10 and the anode electrode 20 can be configured as illustrated in FIG. 23, for example. The cathode electrode 10 in FIG. 23 can be formed of, for example, a composite material of a metal oxide and a metal used for a first oxygen ion blocking layer 110. In FIG. 23, the cathode electrode 10 is formed of a composite material layer MX (Pt, TiOx) of platinum and titanium oxide. The anode electrode 20 can be formed of a composite material of a material used for the solid electrolyte layer 100 and a metal. In FIG. 23, the anode electrode 20 is formed of a composite material layer MX (YSZ, Ni) of YSZ and nickel.

Figure 24:
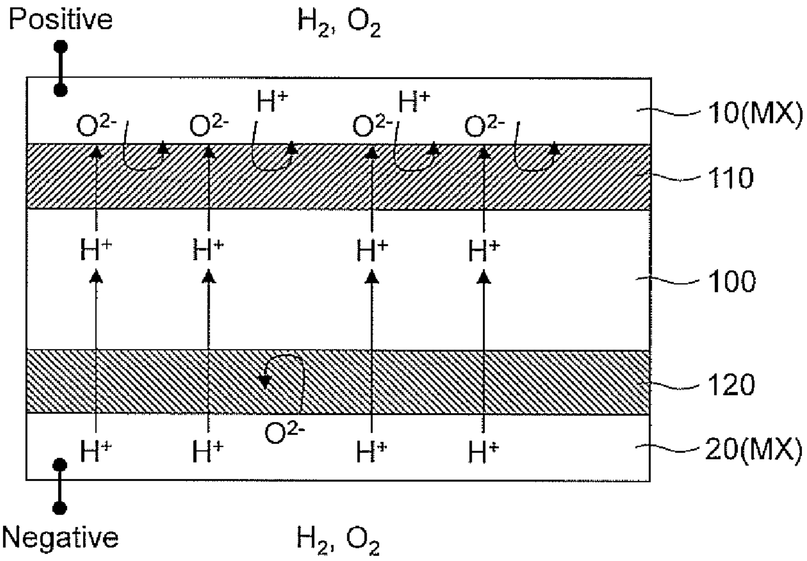
FIG. 24 is a schematic view illustrating an example of the configuration of the thin film process type SOFC of the sixth embodiment.
Figure 24:
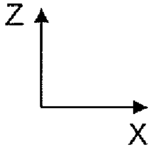

As a modification of the fuel cell membrane electrode assembly of the sixth embodiment, the cathode electrode 10 and the anode electrode 20 can be configured as illustrated in FIG. 24, for example. The cathode electrode 10 can be formed of, for example, a composite material of a metal oxide and a metal used for the first oxygen ion blocking layer 110. In FIG. 24, the cathode electrode 10 is formed of a composite material layer MX (Pt, TiOx) of platinum and titanium oxide. The anode electrode 20 can be formed of, for example, a composite material of a metal oxide and a metal used for the second oxygen ion blocking layer 120. In FIG. 24, the anode electrode 20 is formed of a composite material layer MX (NiO, Ni) of nickel oxide and nickel.

The composite material can be formed using a method such as sputtering film formation using a target having the same composition as that of the composite material, or simultaneous sputtering film formation using two targets of respective constituent materials. In addition, for example, the composite material layer MX (Pt, TiOx) including a metal such as platinum which is hardly oxidized and titanium oxide can be formed by forming a composite material layer of platinum and metal titanium, and then annealing and oxidizing the composite material layer in an atmosphere containing oxygen.

REFERENCE SIGNS LIST

1 fuel cell
2 substrate

3 insulation film
10 cathode electrode
20 anode electrode
50 opening
51 exposed region
100 solid electrolyte layer
110 first oxygen ion blocking layer
110A portion of first oxygen ion blocking layer
110B another portion of first oxygen ion blocking layer
120 second oxygen ion blocking layer
201 fuel gas introduction port
202 fuel gas chamber
203 fuel gas exhaust port
204 air introduction port
205 air chamber
206 air exhaust port
207 shielding plate
208 conductive wire
209 external load
210 hole
301 mixed gas introduction port
302 mixed gas chamber
303 mixed gas exhaust port
304 support substrate
MX composite material layer

The invention claimed is:

1. A fuel cell comprising:

a cathode electrode;

an anode electrode;

a solid electrolyte layer disposed between the cathode electrode and the anode electrode and comprising polycrystalline zirconia or polycrystalline ceria doped with divalent or trivalent positive ions and having proton conductivity; and an atmosphere containing a variable concentration of hydrogen, wherein electrical conductivity of the solid electrolyte increases by increasing the hydrogen concentration and decreases by decreasing the hydrogen concentration, wherein the cathode electrode and the solid electrolyte layer are stacked with a first oxygen ion blocking layer interposed therebetween, and the first oxygen ion blocking layer is a polycrystalline titanium-oxide film having a film thickness greater than 50 nm and less than 5 μm.

2. The fuel cell according to claim 1, wherein the solid electrolyte layer comprises polycrystalline zirconia doped with one or more positive ions selected from the group consisting of $Y3+$, $Mg2+$, $Ca2+$, and $Sc3+$.

3. The fuel cell according to claim 1, wherein the solid electrolyte layer comprises polycrystalline ceria doped with one or more positive ions selected from the group consisting of $Gd3+$ and $Sm3+$.

4. The fuel cell according to claim 1, wherein the solid electrolyte layer has a thickness of 10 nm or more and 500 nm or less.

5. The fuel cell according to claim 1, wherein the anode electrode and the solid electrolyte layer are stacked with a second oxygen ion blocking layer interposed therebetween.

6. The fuel cell according to claim 5, wherein the second oxygen ion blocking layer contains a 3d transition metal oxide or alumina.

7. The fuel cell according to claim 5, wherein the second oxygen ion blocking layer contains nickel oxide or titanium oxide.

8. The fuel cell according to claim 1, wherein the cathode electrode contains one or more selected from the group consisting of platinum, gold, palladium, iridium, rhodium, ruthenium, osmium, (La1−xSrx) (Co1−yFey)O3, Sm0.5Sr0.5Co3, Ba0.8La0.2CoO3, Gd0.5Sr0.5CoO3, (La1−xSrx)MnO3, and (La1−xSrx)FeO3 (wherein $0 \leq x \leq 1$, $0 \leq y \leq 1$).

9. The fuel cell according to claim 1, wherein the anode electrode contains one or more selected from the group consisting of (Ce1−xSmx)O2 doped with copper or nickel, (Ce1−xGdx)O2 doped with copper or nickel, YSZ doped with nickel, platinum, gold, palladium, iridium, rhodium, ruthenium, and osmium (wherein $0 \leq x \leq 1$, $0 \leq y \leq 1$).

10. A fuel cell module comprising:

a fuel gas chamber to which a fuel gas containing the hydrogen is supplied to the atmosphere of the fuel cell;

an air chamber to which air is supplied; and one or more fuel cells according to claim 1, wherein the anode electrode in the fuel cell is formed to come into contact with the fuel gas, and the cathode electrode in the fuel cell is formed to come into contact with the air.

11. A fuel cell module comprising:

a mixed gas chamber to which a mixed gas containing oxygen and the hydrogen is supplied to the atmosphere of the fuel cell; and one or more fuel cells according to claim 1, wherein the anode electrode and the cathode electrode in the fuel cell are formed to come into contact with the mixed gas.

12. A fuel cell comprising:

a cathode electrode;

an anode electrode;

a solid electrolyte layer disposed between the cathode electrode and the anode electrode and comprising polycrystalline zirconia or polycrystalline ceria doped with divalent or trivalent positive ions and having proton conductivity; and an atmosphere containing a variable concentration of hydrogen, wherein electrical conductivity of the solid electrolyte increases by increasing the hydrogen concentration and decreases by decreasing the hydrogen concentration, wherein the cathode electrode and the solid electrolyte layer are stacked with a first oxygen ion blocking layer interposed therebetween, wherein the anode electrode and the solid electrolyte layer are stacked with a second oxygen ion blocking layer interposed therebetween and the first oxygen-ion-blocking layer is a polycrystalline titanium-oxide film having a film thickness greater than 50 nm and less than 5 μm.

13. The fuel cell according to claim 12, wherein the second oxygen ion blocking layer contains a 3d transition metal oxide or alumina.

14. The fuel cell according to claim 12, wherein the second oxygen ion blocking layer contains nickel oxide or titanium oxide.

15. The fuel cell according to claim 1, wherein the fuel cell generates electrical current by oscillating the variable concentration when a constant voltage is applied.

16. The fuel cell according to claim 12, wherein the fuel cell generates electrical current by oscillating the variable concentration when a constant voltage is applied.

17. The fuel cell according to claim 1, further comprising:

a proton conductor that causes the electrical current to oscillate when a constant voltage is applied and the variable concentration of the hydrogen is varied.

18. The fuel cell according to claim 12, further comprising:

a proton conductor that causes the electrical current to oscillate when a constant voltage is applied and the variable concentration of the hydrogen is varied.

19. The fuel cell according to claim 1, further comprising:

a substrate having an insulation film formed thereon, the insulation film defining an opening, wherein the solid electrolyte layer is formed on the substrate to cover the opening.

20. The fuel cell according to claim 19, wherein the substrate comprises silicon, and the insulation film comprises a silicon oxide film.

* * * * *